US010894370B2

(12) United States Patent
Mayer et al.

(10) Patent No.: US 10,894,370 B2
(45) Date of Patent: Jan. 19, 2021

(54) BONDING OBJECTS TOGETHER

(71) Applicant: Woodwelding AG, Stansstad (CH)

(72) Inventors: Jörg Mayer, Niederlenz (CH); Mario Lehmann, Les Pommerats (CH); Joakim Kvist, Nidau (CH); Patricia Poschner, Uettligen (CH)

(73) Assignee: WOODWELDING AG, Stansstad (CH)

( * ) Notice: Subject to any disclaimer, the term of this patent is extended or adjusted under 35 U.S.C. 154(b) by 0 days.

(21) Appl. No.: 16/885,446

(22) Filed: May 28, 2020

(65) Prior Publication Data

US 2020/0316873 A1 Oct. 8, 2020

Related U.S. Application Data

(62) Division of application No. 15/523,724, filed as application No. PCT/EP2015/075592 on Nov. 3, 2015, now Pat. No. 10,668,668.

(30) Foreign Application Priority Data

Nov. 4, 2014 (CH) ........................................ 1684/14

(51) Int. Cl.
*B29C 65/00* (2006.01)
*B29C 65/64* (2006.01)
(Continued)

(52) U.S. Cl.
CPC ............ *B29C 65/645* (2013.01); *B29C 65/08* (2013.01); *B29C 65/606* (2013.01);
(Continued)

(58) Field of Classification Search
CPC ......... B29C 65/00; B29C 65/08; B29C 65/60; B29C 65/606; B29C 65/64; B29C 65/645;
(Continued)

(56) References Cited

U.S. PATENT DOCUMENTS 3,184,353 A 5/1965 Balamuth et al.
3,654,688 A 4/1972 Setzler
(Continued)

FOREIGN PATENT DOCUMENTS

CN 1205668 1/1999
CN 1310120 8/2001
(Continued)

OTHER PUBLICATIONS

International Preliminary Report on Patentability dated May 9, 2017 (May 9, 2017), Application No. PCT/EP2015/075592, 9 pages.

*Primary Examiner* — Jacob T Minskey
*Assistant Examiner* — Matthew Hoover
(74) *Attorney, Agent, or Firm* — Rankin, Hill & Clark LLP

(57) ABSTRACT

A method of bonding a second object to a first object includes: providing the first object having a thermoplastic liquefiable material in a solid state; providing the second object having a surface portion that has a coupling structure with an undercut, so that the second object is capable of making a positive-fit connection with the first object; pressing the second object against the first object with a tool that is in physical contact with a coupling-in structure of the second object while mechanical vibrations are coupled into the tool; continuing to press and couple vibrations into the tool until a flow portion of the thermoplastic material of the first object is liquefied and flows into the coupling structures of the second object; and letting the thermoplastic material re-solidify to yield a positive-fit connection between the first and second objects by the re-solidified flow portion interpenetrating the coupling structures.

17 Claims, 9 Drawing Sheets

(51) Int. Cl.
*B29C 65/60* (2006.01)
*B29C 65/08* (2006.01)
B29C 65/06 (2006.01)
B29L 31/00 (2006.01)
B29L 1/00 (2006.01)

(52) U.S. Cl.
CPC .... *B29C 66/1122* (2013.01); *B29C 66/30321* (2013.01); *B29C 66/30325* (2013.01); *B29C 66/322* (2013.01); *B29C 66/47* (2013.01); *B29C 66/474* (2013.01); *B29C 66/7392* (2013.01); *B29C 66/73116* (2013.01); *B29C 66/742* (2013.01); *B29C 66/8322* (2013.01); *B29C 66/9513* (2013.01); B29C 65/06 (2013.01); B29C 66/30326 (2013.01); B29C 66/71 (2013.01); B29C 66/72141 (2013.01); B29C 66/72143 (2013.01); B29C 66/7315 (2013.01); B29C 66/7394 (2013.01); B29C 66/73118 (2013.01); B29C 66/73921 (2013.01); B29C 66/7422 (2013.01); B29C 66/7461 (2013.01); B29C 66/7465 (2013.01); B29C 66/7487 (2013.01); B29C 66/74283 (2013.01); B29C 66/919 (2013.01); B29C 66/9517 (2013.01); B29C 2793/0045 (2013.01); B29L 2001/005 (2013.01); B29L 2031/737 (2013.01)

(58) Field of Classification Search
CPC ......... B29C 66/00; B29C 66/10; B29C 66/11; B29C 66/112; B29C 66/1122; B29C 66/30; B29C 66/303; B29C 66/3032; B29C 66/30321; B29C 66/30325; B29C 66/32; B29C 66/322; B29C 66/40; B29C 66/47; B29C 66/474; B29C 66/70; B29C 66/73; B29C 66/731; B29C 66/7311; B29C 66/73116; B29C 66/739; B29C 66/7392; B29C 66/74; B29C 66/742; B29C 66/80; B29C 66/83; B29C 66/832; B29C 66/8322; B29C 66/90; B29C 66/95; B29C 66/951; B29C 66/9513
See application file for complete search history.

(56) References Cited

U.S. PATENT DOCUMENTS

| | | | | |
|---|---|---|---|---|
| 5,271,785 | A | * | 12/1993 | Devine ............ B29C 66/81431 156/73.2 |
| 2010/0079910 | A1 | * | 4/2010 | Tomizawa ............... G11B 5/02 360/110 |
| 2010/0079970 | A1 | * | 4/2010 | Prest .................... B29C 65/645 361/807 |

FOREIGN PATENT DOCUMENTS

| | | |
|---|---|---|
| DE | 10 2011 011 215 | 8/2012 |
| FR | 1519111 | 3/1968 |
| FR | 2112523 | 6/1972 |
| GB | 1180383 | 2/1970 |
| JP | 52-115474 | 9/1977 |
| JP | 55-71525 | 5/1980 |
| JP | 2000-62029 | 2/2000 |
| JP | 2001-277363 | 10/2001 |
| JP | 2008-504990 | 2/2008 |
| WO | 98/42988 | 10/1998 |
| WO | 2008/080238 | 7/2008 |
| WO | 2015/117253 | 8/2015 |

* cited by examiner

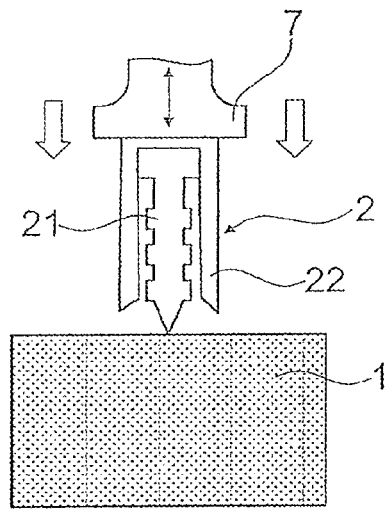
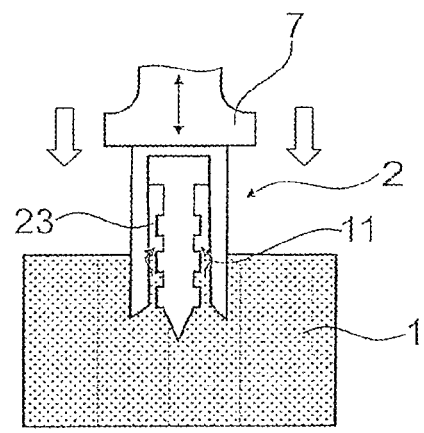
Fig. 3a
Fig. 3b
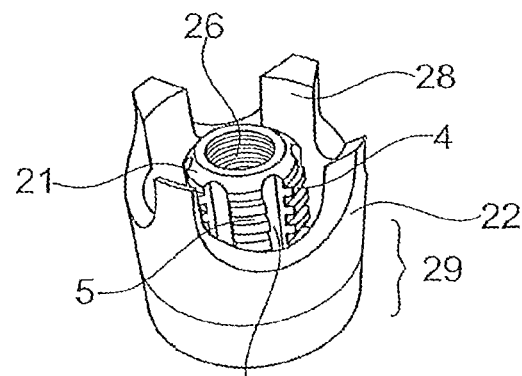
Fig. 4a
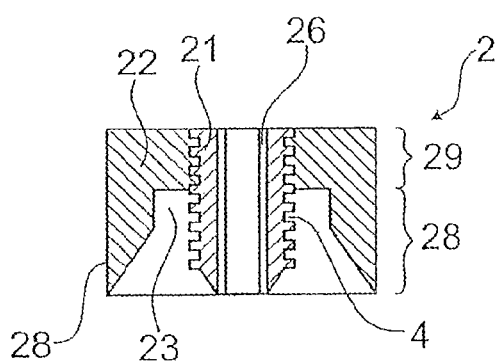
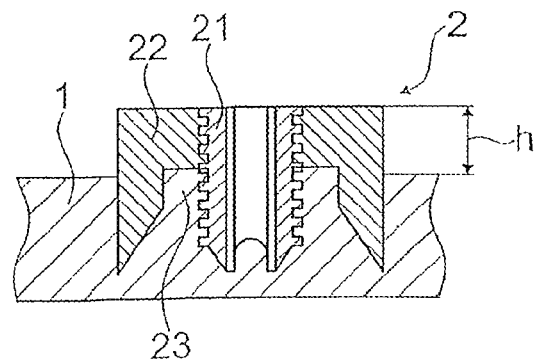
Fig. 4b
Fig. 4c

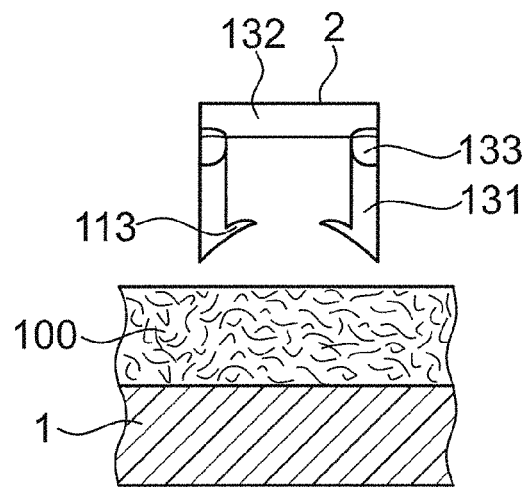
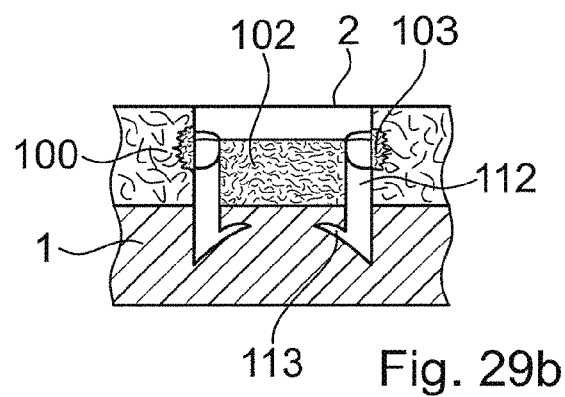
Fig. 29a  Fig. 29b
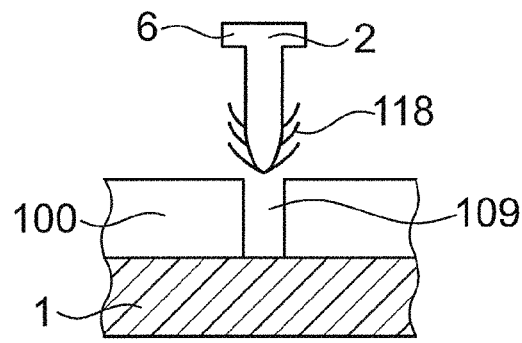
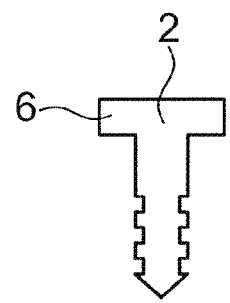
Fig. 30  Fig. 31
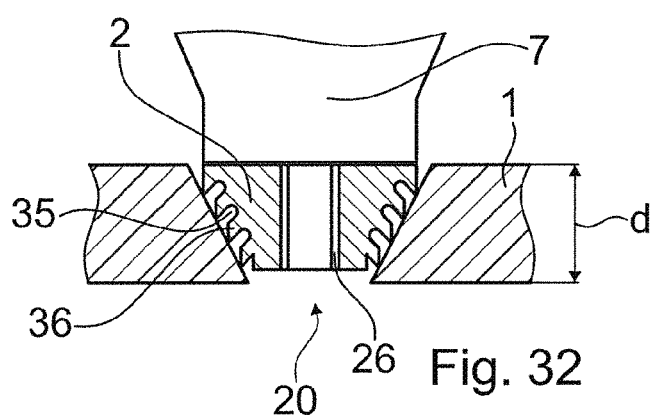
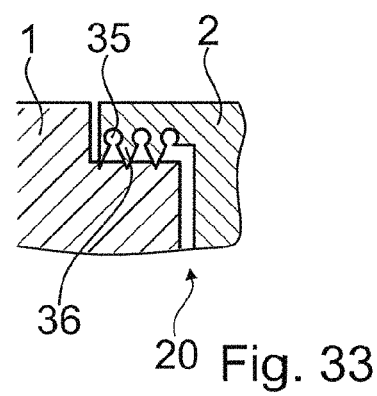
Fig. 32  Fig. 33
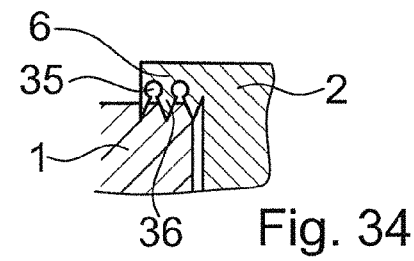
Fig. 34

BONDING OBJECTS TOGETHER

CROSS REFERENCE TO RELATED APPLICATIONS

This application is a divisional application of U.S. application Ser. No. 15/523,724 filed May 2, 2017, which itself is a national stage filing of PCT/EP2015/075592 filed Nov. 3, 2015, and claims priority to CH 01684/14 filed Nov. 4, 2014, all of which are expressly incorporated herein by reference.

BACKGROUND OF THE INVENTION

Field of the Invention

The invention is in the fields of mechanical engineering and construction, especially mechanical construction, for example automotive engineering, aircraft construction, shipbuilding, machine construction, toy construction etc.

Description of Related Art

In the automotive, aviation and other industries, there has been a tendency to move away from steel constructions and to use lightweight material such as aluminum or magnesium metal sheets or polymers, such as carbon fiber reinforced polymers or glass fiber reinforced polymers or polymers without reinforcement, for example polyesters, polycarbonates, etc. instead.

The new materials cause new challenges in bonding elements of these materials—especially in bonding flattish object to another object.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond.

FR 1 519 111 teaches a method of fastening a screw or similar fixation element to a thermoplastic body by applying high-frequency vibration to it to displace thermoplastic matter and cause it to flow in an interior cavity of the fixation element. U.S. Pat. No. 5,271,785, FR 2,112,523, U.S. Pat. Nos. 3,184,353, 3,654,688, and GB 1,180,383 teach securing a metallic body to a thermoplastic body by bringing the bodies into contact and subjecting the metallic body to mechanical vibration until thermoplastic material of the thermoplastic body liquefies, the metallic body is essentially fully enwrapped in the thermoplastic body, and thermoplastic material flows into recesses of the metallic body. All of these methods are suitable only for anchoring a metallic part in a deep thermoplastic object, and the required energy input and corresponding impact on the parts to be connected is substantial.

US 2010/0079910 teaches manufacturing an electronic device with a plastic housing part and a metallic housing part, wherein the plastic housing part is attached to the metallic housing part by an ultrasonic bond. The applications of the concept taught in US 2010/0079910 are limited.

A further concept of prior art approaches includes shaping the thermoplastic body to include a flange-like protrusion into which a fastening element, such as a nut, is pressed. This concept, however, has the disadvantage of being more complex, as shaping plastic parts that otherwise may have a simple, for example sheet-like, form with a flange, which depending on the application needs to have a precisely defined position, may drastically increase the manufacturing cost.

SUMMARY OF THE INVENTION

It is an object of the present invention to provide a method of bonding two objects together, the method overcoming drawbacks of prior art methods and being especially suited for bonding a second object to a first object of a polymer-based material. It is a further object to provide equipment for carrying out the method.

According to an aspect of the invention, a method of bonding a second object to a first object, the method including the steps of:
  providing the first object, the first object including a thermoplastic liquefiable material in a solid state;
  providing the second object, the second object including a surface portion that has a coupling structure with an undercut, and/or in which the second object, as described hereinafter, is capable of being deformed to include such a coupling structure with an undercut, whereby the second object is capable of making a positive-fit connection with the first object;
  pressing the second object against the first object by a tool that is in physical contact with a coupling-in structure of the second object while mechanical vibrations are coupled into the tool,
  continuing the step of pressing and coupling vibrations into the tool until a flow portion of the thermoplastic material of the first object is liquefied and flows into the coupling structures of the second object,
  letting the thermoplastic material of the first object re-solidify to yield a positive-fit connection between the first and second objects by the liquefied and re-solidified flow portion interpenetrating the coupling structures.

The liquefaction of the flow portion in this is primarily caused by friction between the vibrating second object and the surface of the first object, which friction heats the first object superficially.

A special property of the approach according to many embodiments of the invention is therefore also that the flow portion that has been generated in a contact zone between the first and second objects may immediately flow into existing cavities of the second object, and thereby the zone that is influenced by the heat generated during the process remains small, for example essentially restricted to the intermixing zone.

The flow behavior of the flow portion will be influenced by the fact that due to the approach according to the present invention, a material flow is generated towards the surface of the non-liquefiable material (i.e. the second object; convergent flow), to which surface, by the vibrations and friction, heat is continuously supplied. Thus, generally little heat will flow away. Therefore, a large penetration depth of thermoplastic material into the coupling structures becomes achievable even after a short process time, the flow not being stopped by heat loss of liquefied material coming into contact with cold spots. This is in contrast for example to the "Woodwelding" process as, for example, described in WO 98/42988 where there is a divergent flow by liquefied material flowing away from the interface zone and thus transporting heat away into structures that have remained cold.

The first and second objects are construction components (construction elements) in a broad sense of the word, i.e.

elements that are used in any field of mechanical engineering and construction, for example automotive engineering, aircraft construction, shipbuilding, building construction, machine construction, toy construction, etc. Generally, the first and second objects will both be artificial, man-made objects, and at least the first object will include artificial material; the additional use of naturally grown (non-living matter) material, such as wood-based material, in the first and/or second object is not excluded.

The materials of the first object and of the second object may be homogeneous or inhomogeneous. For example, the first object may have the thermoplastic material and in addition include other, non-liquefiable material, and/or it may have a plurality of layers of thermoplastic material of different compositions. Similarly, the second object may include different portions of different materials, as explained in more detail hereinafter. Additionally or as an alternative, in embodiments, the second object may be caused to penetrate through a plurality of objects (the first object plus at least one further object) to secure the plurality of objects to each other, as also explained in more detail hereinbelow.

The coupling-in structure may be a coupling-in face, especially constituted by a proximal-most end face, with or without guiding structures (such as a guiding hole for an according protrusion of the tool), for a separate sonotrode that serves as the tool. In alternative embodiments, the coupling-in structure may include a coupling that couples the second object directly to a vibration generating apparatus, which vibration generating apparatus then serves as the tool. Such a coupling may for example be by a thread or a bayonet coupling or similar. Thus in these embodiments, the second object is at the same time a sonotrode coupled to a vibration generating apparatus.

In other embodiments, the tool is a sonotrode fastened to a vibration generating apparatus. Sonotrodes of this kind are for example known from ultrasonic welding.

In even further embodiments, the tool may be an intermediate piece (different from the first object), against which intermediate piece a sonotrode presses and which is of a material that does not liquefy under the conditions that apply during the process. Generally, the approach according to aspects of the invention excludes that the vibrations are coupled into second object only via first object; rather a physical contact between the second object and the vibrating tool is required.

The flow portion of the thermoplastic material is the portion of the thermoplastic material that during the process and due to the effect of the mechanical vibrations is caused to be liquefied and to flow.

The coupling structures of the second object are of a material that is not liquefiable. As explained in more detail hereinafter, this definition includes the possibility that the material is liquefiable at a substantially higher temperature than the material of the first object, such as a temperature higher by at least 50°. In addition or as an alternative, the condition may hold that at a temperature at which the first object's thermoplastic material is flowable, the viscosity of the material of the second object is higher than the viscosity of the thermoplastic material of the first object by orders of magnitude, for example by at least a factor between $10^3$ and $10^5$. In addition or as an alternative to including a different liquefiable matrix material with a different liquefaction temperature and/or different glass transition temperature, this can also be achieved by a higher filling grade of for example a fiber filler.

Coupling structures may include sequences of radial protrusions and indentations (such as ribs/grooves), an open porous foam-like structure, openings open to the distal side, which openings define an undercut by being widened, at least into one lateral direction, towards a proximal side, etc. Any structure that defines an undercut with respect to axial directions is suitable.

In coupling structures that include sequences of radial protrusions and indentations (for example around an outer surface of a portion of the second object or along an interior surface of the second object), d depth of the intermixing zone may be defined as radial depth into which the flow portion penetrates starting at outermost protrusions, In coupling structures that include an open porous structure, the depth of the intermixing zone may be defined as the depth of the open porous structure into which the thermoplastic material penetrates starting at the surface of the open porous structure, measured perpendicularly thereto. Similarly, in coupling structures that include openings open to the distal side the depth of the intermixing zone may be defined as the depth into which the thermoplastic material penetrates starting at the distally facing surface.

Especially, in embodiments the mechanical vibration transmitting parts of the second object consist of metal and/or other hard materials (glasses, ceramics, etc.) and/or thermosetting plastics and/or thermoplastics that remain below their glass transition temperature during the entire process.

In a special group of embodiments, the second object includes a second thermoplastic material having a liquefaction temperature substantially higher than the liquefaction temperature of the first object thermoplastic material. Then, after the step of causing a flow portion of the thermoplastic material of the first object is liquefied, the second object may be pressed against a support or a non-liquefiable portion of the first object while coupling vibrations into the second object is continued (with a same or a higher or possibly even a lower intensity than initially) until a second flow portion of the second thermoplastic material is liquefied and leads to a deformation of the second object. Especially, this further method step may be carried out as described in WO 2015/117253, incorporated herein by reference, until a foot portion and/or a head portion of the second object is created for bonding the first and second objects together by an additional rivet effect.

While embodiments of this special group of embodiments include the second object, after the bonding process, reaching through the first object to the distal side, in an alternative group of embodiments the distal side is left intact, i.e. an intermixing zone that includes portions of the first and second objects does not reach to the distal side.

In embodiments, the second object is anchored in a depth-effective manner by providing the second object with an anchoring portion that extends along the anchoring axis, optionally with structure elements that are arranged on a peripheral surface of the second object and/or along an inner surface of an axially extending portion of the second object.

In embodiments, especially the penetration depth, by which the second objects penetrates into the first object, i.e. the axial extension of those parts of the second object that penetrate into the first object, is larger (for example substantially larger) than a depth of the intermixing zone, i.e. the zone in which both, portions of the first and second object are present after the bonding process. In other words, in these embodiments including depth-effective anchoring, a width of the one part of the second object that penetrates into the first object in at least one lateral dimension, and often in both lateral dimensions, is smaller than the penetration depth by which the second object penetrates into the first object.

The depth of the intermixing zone is then defined as the characteristic depth of the structure elements on the peripheral surface, i.e., a depth measured perpendicular to the anchoring axis.

Embodiments of a group include, in addition or as an alternative to including depth-effective anchoring, a bonding surface with a plurality of structure elements that are spaced laterally from each other and/or possibly form an extended, for example circumferential, groove, the bonding surface following a surface portion of the first object. For example, if the first object is planar, the structure elements will extend along a plane.

Embodiments, for example embodiments that include a depth-effective anchoring, may include providing a bore in the first object prior to the step of pressing, and in the step of pressing, a part of the second object is pressed into the bore. In this, a bore diameter is preferably chosen to be less than an outer diameter of the part pressed into the bore. Such a bore may be a blind hole or a through bore. Also anchoring in other indentations such as grooves etc. is possible.

A through bore may also be advantageous in embodiments, in which the second object is comparably thin, such as a thermoplastic sheets. The method of bonding a second object to the first object may then include lining the through bore with the second object, for example for the purpose of fastening a further object thereto, to serve as a feedthrough, serve as barrier that is crossable under pre-defined conditions only (as is the case for a septum or for a second object with a removable cover or similar) or have another purpose. In embodiments of this special category, the thickness of the first object may correspond to 2-40 times or 2-20 times, especially between 3 times and 10 times the interpenetration depth (depth of the intermixing zone).

In accordance with an even further group of embodiments, the bonding is carried out in a "planar bond" or "flattish bond" manner, with a comparably small penetration depth. This group of embodiments may especially be suited also for bonding a second object to a first object that is comparably thin or that is sensitive to damages or has high requirements for leaving other surfaces than the one to which the second object is bonded intact.

In embodiments of this group, the second object includes a plurality of structure elements for the liquefied material to flow into, which structure elements are spaced laterally from each other, i.e. extend along a plane which during the anchoring is parallel to a surface plane of the first object or, if the case may be, extend along another, non-planar surface of the first object. Especially, the bond between the first and second object may be a planar bond, wherein the area of the interface between the first and second object is essentially parallel to the surface plane of the first object and has, at least in one dimension, preferably in both in-plane dimensions, substantially greater than the penetration depth, for example greater by at least a factor 2 or 3, at least a factor 5, or at least a factor 10. In this, the penetration depth may be equal to the depth of the intermixing zone or may be smaller than the latter.

Embodiments that include bonding with a small penetration depth compared to the depth of the intermixing zone may also include bonding of the second object to a not planar surface portion of the first object. For example, the first object may have a certain proximally facing surface contour, and the second object may have an overall shape following this contour or may be deformable to do so.

Alternatively, the first object may have a countersunk or opening or opening provided with another structure along its periphery, wherein the second object has an accordingly adapted (for example conical if the opening is countersunk) shape. In embodiments where the first object is comparably thin and there are requirements for the distal surface, the structure elements of the second object may in such embodiments adapted to the depth. Especially, the relative sizes of the structure elements may decrease towards distally, so that their capacity to accommodate flowable material decreases towards the distal side, and accordingly does the heat impact.

In embodiments, a design criterion is that the volume of structure elements (such as indentations or pores) into which the liquefied material can flow is larger than the displaced volume. This leads to a criterion for embodiments of the invention according to which along the surface parts that include the coupling structures the porosity is at least 50% for a certain depth. The porosity here is defined as a fraction that empty spaces take up of the total volume, measured from an outer convex hull to a certain depth (corresponding to a depth of the intermixing zone, measured in axial direction); it may apply also to macroscopic structures that are not necessarily viewed as "pores". If this optional design criterion is fulfilled, no volume has to be displaced to the surface or sideways or similar.

More in general, in embodiments, the method may include causing the flow portion to flow into the indentations and/or pores and preventing the flow portion from flowing to regions laterally of the second object.

To this end, optionally, in addition to providing an indentation/pore volume satisfying the above condition, the method may also include pressing a (non-vibrating) retaining device against proximal surface of the first object in a vicinity of the second object, for example around the interface between the first and second objects. Such a retaining device may prevent bulges or the like around the location where the second object is anchored in the first object.

In embodiments of this group of "planar bond" or other "flattish bond" anchoring, the second object in addition to cavities (indentations/pores) includes a distal protruding structure that may for example serve as energy director. Especially, such distal protruding structure may have a shape with a portion that tapers towards the distal side, for example ending in a tip or edge or rounded distal end. In this case, a lateral distance between the distal protruding structure and the cavity accommodating the flow portion may be minimal. Especially, any spacing between such distal protruding structure and the cavity may be avoided, so that the overall shape of the second object at the distal surface is undulated between the distal protrusion and cavity.

In embodiments of all groups described hereinbefore, the coupling structures that include an undercut with respect to axial (proximodistal) directions and thereby make a positive-fit connection possible, are pre-manufactured properties of the second object.

In addition or as an alternative, the second object may include a deformable portion, and the method may include making a structure for a positive-fit connection during the process of pressing the second object against the first object while mechanical vibrations are coupled into the second object.

For example, the second object may include a plurality of deformable legs or a deformable collar extending in a substantially axial direction as a deformable structure. During the process, the deformable structure is bent away from the axial direction so that after re-solidification an undercut is formed.

Embodiments using this principle of deformation may feature the advantage that the effective anchoring area may, due to the deformation, be larger than the surface area portion of the first object penetrated by the second object, i.e. the footprint may be enlarged compared to an embodiment without the deformation.

A further possible advantage is that, for example, a lightweight deformable material may be used for the deformable portion. Especially, a material may be used that is deformable at the temperature at which the process takes place but that exhibits substantial stiffness at room temperature (or, more generally, the temperature at which the assembly will be used). For example, the deformable portion may be of a thermoplastic material with a glass transition temperature that is substantially higher than the glass transition temperature of the first object thermoplastic material of which the flow portion is formed.

In a specific embodiment, of this principle, PBT (Polybutylene terephthalate) was used as the first object thermoplastic material, which material becomes flowable at temperatures of about 180° C., and PEEK was used as a material of the second object's portion that includes the deformable portion. PEEK is not liquid/flowable at 180° C. but is above its glass transition temperature (being about 140° C.).

More in general, in embodiments in which the deformable portion includes a thermoplastic material, it may be advantageous if the glass transition temperature of the deformable portion is between the glass transition temperature of the first object thermoplastic material and the temperature at which the thermoplastic material becomes sufficiently flowable.

In this text, the liquefaction temperature or the temperature at which a thermoplastic material becomes flowable is assumed to be the melting temperature for crystalline polymers, and for amorphous thermoplastics a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s).

For applying a counter force to the pressing force, the first object may be placed against a support, for example a non-vibrating support. According to a first option, such a support may include a supporting surface vis-à-vis the spot against which the first object is pressed, i.e. distally of this spot. This first option may be advantageous because the bonding can be carried out even if the first object by itself does not have sufficient stability to withstand the pressing force without substantial deformation or even defects.

In embodiments that include deforming the second object during the process of pressing the second object against the first object, the support may include a shaping feature that assists the deformation process. For example, the support may be shaped to have a shaping protrusion or shaping indentation, to cause an outward bending or inward bending of the deformable structure, respectively.

It is further possible that the method uses a cooling effect by the support on the thermoplastic material of the first object, whereby the thermoplastic material of the first object is kept at a cooler temperature and thus remains harder at an interface to the support. Thereby, the deformable structure will be caused to deform such as not to get too close to the interface with the support.

According to a second option, the distal side of the first object may be exposed, for example by the first object being held along the lateral sides or similar. This second option features the advantage that the distal surface will not be loaded and will remain unaffected if the second object does not reach to the distal side.

In embodiments, the first object is placed against a support with no elastic or yielding elements between the support and the first object, so that the support rigidly supports the first object.

In a group of embodiments, the second object includes an inner portion and an outer portion, with a gap therebetween. Then, the coupling structures of the second object may include outer structures of the inner portion and/or inner structures of the outer portion and/or outer structures of the outer portion, and the step of causing a flow of the flow portion includes causing a flow into the gap.

According to an option, inner and outer portions may together be of one piece.

In a group of embodiments, the second object includes a first portion of a first material and a second portion of a second material. This group of embodiments, for example, may make possible to save cost if the first portion includes critical sections, such as a thread or other structure for connecting a further element to the assembly of the first and second objects, is made of a high-quality building material, for example stainless steel, titanium, aluminum, copper, etc., whereas the second portion may include a lower cost material and primarily serve for stabilization of the second object with respect to the first object.

Especially, if the second object includes an inner portion and an outer portion, the inner portion may be of the first material and the outer portion may be of the second material. Thereby, by the flow of the flow portion into the gap, the second object itself is also stabilized, in addition to being bonded to the first object.

Embodiments that include a first portion of a first material and a second portion of a second material may, for example, include embodiments of the above-discussed group that include a deformable portion. In these, the deformable portion may, for example, belong to the second portion of a second material, and mounting structure for mounting a further object to the first object or for another function may be of another, not deformable material, such as of a hard metal.

An further advantage of embodiments with a first and a second material (in addition to optionally including a deformable portion, with the above-discussed advantages) is that they provide the possibility of using a lightweight and/or low cost material for those parts of the second object that use up a lot of space (for example, to yield a sufficiently large footprint in the above sense) while maintaining the possibility of having a sufficiently stable/stiff functional piece, for example with a thread or other functional structure, constituted by the first portion.

If the second material is itself capable of being deformed and possibly capable of flowing, at temperatures above the liquefaction temperature of the first object material, this approach may feature the even further advantage that the first and second portions may optionally be assembled in situ if they are initially not connected with each other or only loosely connected. For example, the second material may flow relative to the first material to embed a part of the first portion, for example in a positive-fit like manner.

In a group of embodiments, the second object may constitute a mounting piece (mounting pillar, mounting plug, etc.) for mounting a further object to the first object. Especially, an inner portion of the above-described kind may include a mounting structure, such as a thread or bayonet fitting structure or guide bushing or snap-on structure, etc.

The outer portion may serve as a fastening flange for fastening the mounting structure. Compared to prior art fastening flanges, this approach has substantial advantages:

Instead of two separate steps for providing a fastening flange and for mounting the fastening element to the fastening flange, the entire structure may be attached in one single step.

The positioning of the mounting piece may optionally be done directly at the otherwise completed first object, for example after the latter has been placed relative to further parts and/or for example in presence of the further object. Thus, during the manufacturing of the first object itself, there is no need for a precise alignment step. Therefore, the precision of the positioning in relation to the end product may be drastically increased.

Due to the approach according to the invention, anchoring of the mounting structure is effective also in situations where the first object is comparably thin and/or where another, distal surface of the first object needs to remain unaffected. This is in contrast to the above-discussed prior art approaches that include plunging a metallic body (threaded bush or the like) in a thermoplastic material.

Especially, in embodiments the second object includes a proximal body and, distally thereof, a plurality of distal extensions that in the step of pressing are pressed into the first object. Especially, the distal extensions may include at least one outer extension and at least one inner extension.

For example, the proximal body may include a portion in the above-mentioned sense of a second material, and, embedded therein, a portion of a first material, which portion of the first material is accessible from the proximal side also after the step of letting the thermoplastic material re-solidify, and which may have the mounting structure. The portion of the first material may extend distally to form at least one of the distal extensions (such as a central protrusion) or may be restricted to the proximal side.

In a group of embodiments, the first object is a flattish object, such as a polymer plate, for example a polymer cover.

The bond between the second object and the first object may have any purpose of a bond between two objects. For example, in the automotive or aviation industries, the bond may be a bond between a structural element of plastic (first object) and a metallic or compound material structural element.

In a group of embodiments, the second object may be an anchor in the first object for fastening a further element thereto.

In another group of embodiments, the second object may be a connector that bonds a further, third object to the first object by the method described herein. These embodiments thus concern:

A method of connecting a third object to a first object by bonding a second object to the first object and thereby securing the third object to the first object, the method including the steps of:
providing the first object, the first object including a thermoplastic liquefiable material in a solid state;
providing the third object;
providing the second object, the second object including a surface portion that has a coupling structure with an undercut and/or is capable of being deformed to include such a coupling structure with an undercut, whereby the second object is capable of making a positive-fit connection with the first object;
arranging the third object relative to the first object,
pressing the second object against the first object by a tool that is in physical contact with a coupling-in structure of the second object while mechanical vibrations are coupled into the tool,
continuing the step of pressing and coupling vibrations into the tool until a flow portion of the thermoplastic material of the first object is liquefied and flows into the coupling structures of the second object,
letting the thermoplastic material of the first object re-solidify to yield a positive-fit connection between the first and second objects by the liquefied and re-solidified flow portion interpenetrating the coupling structures,
wherein the step of pressing the second object against the first object is carried out until the second object is in physical contact with the third object and secures the third object to the first object.

Especially, in the step of arranging the third object relative to the first object, the third object may be placed proximally of the first object, and after the step of arranging, the second object may be caused to penetrate the third object until a distal portion thereof reaches the first object for the second object to be pressed against the first object.

For example, to this end, the third object may be of a liquefiable thermoplastic material or otherwise penetrable material for the second object to penetrate through the third object until its distal portion reaches the first object.

Then, it is further possible to arrange the coupling structure of the second object in a manner that a positive-fit connection is also caused with the third object, in addition to the connection with the first object.

In addition or as an alternative, the third object may include a bore through which the distal portion of the third object is guided to reach the first object.

For securing the third object to the first object, the second object may include a head or bridge portion that rests against a proximally facing surface portion of the third object while the distal portion of the second object is anchored in the first object.

In addition or as an alternative, if the third object includes thermoplastic material, a positive-fit connection between the second and third objects may be caused by material of the third object penetrating into structures of the second object, in addition to material of the first object interpenetrating the coupling structures.

In addition or as yet another alternative, thermoplastic material of the third object may be caused to be welded to thermoplastic material of the first object by the effect of the second object being pressed into the assembly of the third and first objects or may be caused to interpenetrate flowable material of the first object in a non-mixing manner to yield a mechanical and/or adhesive connection after the re-solidification.

It is even an option that material of the third object that is bonded to the first object includes an elastomeric material or other material, even if such material is not liquefiable, and even if no pre-manufactured opening is present. Especially, a cutting portion of the second object may pierce through a portion of the third object until it comes into contact with the first object placed distally thereof.

In this way (bonding of not meltable or meltable soft material to a thermoplastic first object), connections between hard and soft materials become possible, that for example cannot be processed together in hard/soft injection molding. An example would be the bonding of a damping cushion (third object) to a thermoplastic first object, such as a thermoplastic sheet.

In a group of embodiments, the second object comprises, at the surface that during the pressing and vibrating is in direct contact with the first object, structures serving as energy directors, such as edges or tips. While for ultrasonic welding and also for the "Woodwelding" process as for example described in WO 98/42988 or WO 2008/080 238, energy directors are known, they will generally be present on the object of the material to be liquefied. Embodiments of the present invention, however, reverse this by providing energy directors on material that is not liquefied but is interpenetrated by liquefied material.

The invention also concerns a connecting element for being secured, in a method as described in this text, to a first object that includes a thermoplastic material. More in particular, any properties of second objects that are described and/or claimed referring to the method may be properties of the connecting element and vice versa.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process since the mechanical vibrations are transferred directly to the second object by the tool.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material that has no thermoplastic properties or has thermoplastic properties including a melting temperature range that is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example, by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, the non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In embodiments in which both, the first and the second object include thermoplastic material, the material pairing is chosen such that the melting temperature of the second object material is substantially higher than the melting temperature of the first object material, for example higher by at least 50°. Suitable material pairings are for example polycarbonate or PBT for the first object and PEEK for the second object.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is, e.g., designed such that its contact face oscillates predominantly in the direction of the tool axis (longitudinal vibration) and with an amplitude of between 1 and 100 μm, preferably around 30 to 60 μm. Such preferred vibrations are, e.g., produced by ultrasonic devices as, e.g., known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion". The "axis" is the proximodistal anchoring axis along which the pressure in the step of pressing is applied. In many embodiments, the mechanical vibrations are longitudinal vibrations with respect to the axis.

BRIEF DESCRIPTION OF THE DRAWINGS

In the following, ways to carry out the invention and embodiments are described referring to drawings. The drawings are schematic in nature. In the drawings, same reference numerals refer to same or analogous elements. The drawings, unless otherwise specified, show views of cross sections along a plane parallel to the anchoring axis ("vertical" cross sections). The drawings show:

FIGS. 3a and 3b a bonding process with an alternative second object;

FIG. 4a a view, from the distal side, of a second object;

FIG. 4b a cross section of a second object similar to the one of FIG. 4a;

FIG. 4c the second object of FIG. 4b anchored in a first object;

FIGS. 29a and 29b a process of bonding a foam material to a thermoplastic first object;

FIG. 30 a further arrangement for bonding a second object to a first object;

FIG. 31 a variant of a second object;

FIG. 32 an even further process of bonding a second object to a first object;

FIGS. 33, 34 and 35 variants of this process;

DESCRIPTION OF THE PREFERRED EMBODIMENTS

Figure 1A:
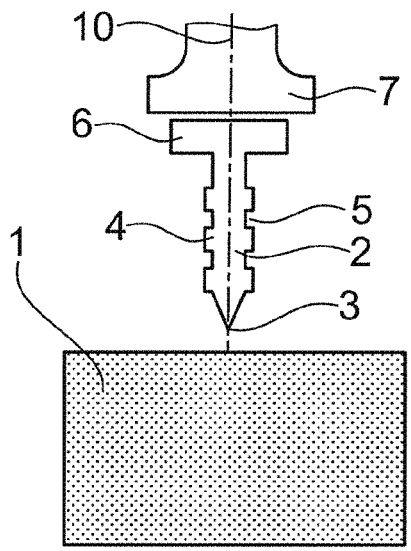
FIGS. 1a-1d stages of an bonding process according to a first embodiment of the invention.

FIG. 1a depicts a basic set-up of embodiments of the invention. The first object 1 consists of a thermoplastic material, for example of polybutylene terephthalate (PBT), compact or foamed, or polycarbonate or Acrylonitrile butadiene styrene or any other thermoplastic polymer that is solid at room temperature and, for example, has a melting temperature of less than 250° C.

The second object is, for example, metallic or of plastic (thermosetting or thermoplastic). If the second object is liquefiable, the liquefaction temperature is such that it is not flowable at temperatures at which the first thermoplastic is flowable. For example, the melting temperature of the second object material is higher than the melting temperature of the first material by at least 50° or at least 80° C.

The second object has a structure capable of making a positive-fit connection with material of the first object after the latter has flown. More in particular, the second object has a surface portion that has an undercut with respect to axial directions (axis 10). For example, the surface structure includes at least one rib 4 running in a non-axial direction or at least one hump. In the depicted embodiment the second object is assumed to be rotationally symmetrical about the axis 10 and includes a plurality of circumferential ribs 4 between which grooves 5 are formed.

At the distal end, the second object has a tip 3, and at the proximal end, a head portion 6 forms a proximally facing coupling face for the mechanical vibrations.

Figure 1B:
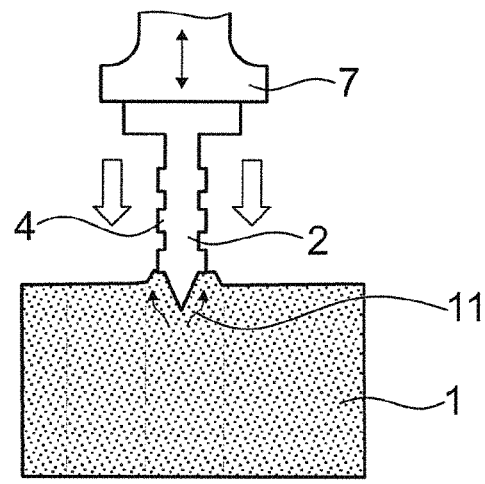

A sonotrode 7 is used to press the second object against the first object while mechanical vibrations are coupled into the second object. As shown in FIG. 1b, liquefaction of material of the first object sets in starting at the interface to the tip 3. The continued pressing of the second object into the first object will cause the second object to be moved relative to the first object in the direction of the block arrows. A flow 11 of liquefied thermoplastic material of the first object sets in.

Figure 1C:
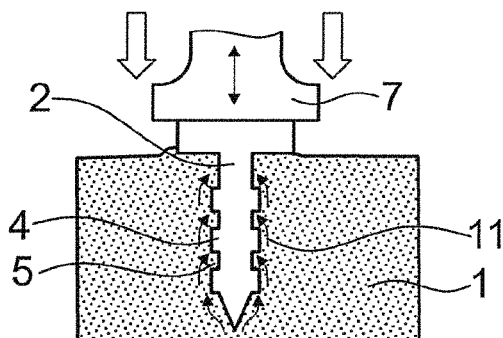

FIG. 1c shows the configuration towards the end of the process. Because the first object will only be liquefied in a vicinity of the surface of the second object but will remain solid and thus exhibit some stiffness elsewhere, the liquefied material cannot evade arbitrarily, the pressing of the second object into the first object will generate some hydrostatic pressure on the first object, and this will cause the flow 11 to immediately fill the undercut structures, such as the grooves 5.

Figure 1D:
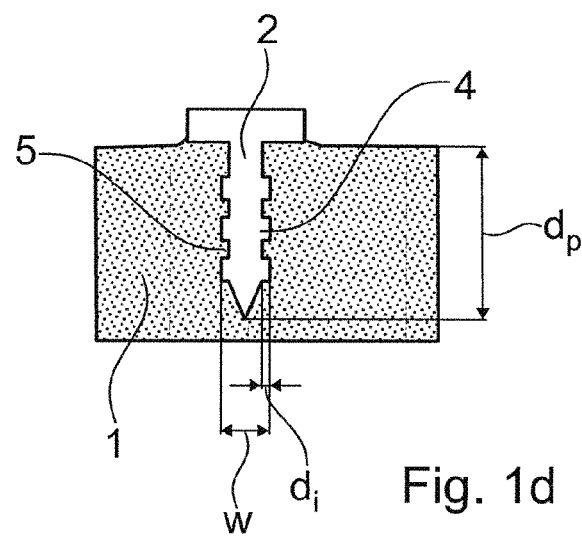

After the vibrations have stopped, the liquefied thermoplastic material will again solidify, leaving the second object solidly anchored in the first object (FIG. 1d).

FIG. 1d also illustrates the penetration depth $d_p$ and the depth $d_i$ of the intermixing zone (interpenetration depth) which latter is the depth into which the flow portion penetrates starting at outermost surface features of the second object, here the depth $d_i$ of the intermixing zone corresponds to the depth of the grooves 5. As can be seen in FIG. 1d, in these embodiments with depth-effective anchoring, the penetration depth is substantially larger than the depth of the intermixing zone.

FIG. 1d also shows the width w of the portion of the second object that penetrates into the first object. Clearly, the width is smaller than the penetration depth, as is a further possible characteristic of embodiments of depth-effective anchoring.

The second object in this and other embodiments described in this text may have the function of serving as a connector, (nut, threaded bolt, etc.) feedthrough, bushing, other connector etc.

In FIGS. 1a-1d, it is assumed that the second object 2 is pushed through a surface of the first object 1 (similar considerations apply if on top of the first object, a further, third object is placed, as discussed in more detail hereinafter, for example referring to FIGS. 21a/21b, 29a/29b, 30). During the process, a volume corresponding to the volume of an anchoring portion of the second object (here: the shaft, i.e. the second object without the head portion 6) is displaced, for example to proximal directions and/or the introduction of the second object causes a slight deformation of the whole first object.

In cases where:
such displacement and/or deformation is undesired and to be kept at a minimum, and/or
due to the shape/dimensions of the second object and/or resistance of the first object it is difficult to push the second object through a surface of the first object, and/or
guidance of the second object during introduction merely by the sonotrode and/or external means is difficult,
it is and option to provide the first object with a bore 20 prior to the step of pressing the second object against the first object. This is, again schematically, illustrated in FIG. 2.

For the diameter $d_h$ of the bore, the following considerations may apply (not only for shapes like the one shown in FIG. 2 but generally for a part of the second object that during the process is pressed into a bore):
The diameter $d_h$ of the bore should be smaller than an outer diameter $d_2$ of protruding structures of the anchoring portion of the second object (the ribs 5 in the depicted embodiment). Exceptions to this principle can be envisaged for non-circular symmetric geometries.
In most embodiments, the diameter $d_h$ of the bore should be chosen such that the volume of the bore is equal to or smaller than the volume taken up by the anchoring portion. In other words, the bore diameter in these embodiments should be chosen such that the volume of displaced portions of the thermoplastic first object material is at approximately equal to or larger than the volume of structures into which the displaced volume can flow. However, especially in embodiments where the coupling structures are defined by an open porous structure of the second object, into which the flowable material flows against some resistance, this need not be the case.
Depending on the requirements and on material properties, the diameter $d_h$ of the bore can be chosen to approximately correspond to a smaller diameter $d_1$ of the anchoring portion (if defined; here the smaller diameter corresponds to the diameter at axial positions where the grooves are) or to be smaller than the latter or to be larger than the latter (but not larger than the outer diameter $d_2$).

In the different embodiments described in this text, the distal tip 3 or edge as well as edges of the ribs or other protruding features of the coupling structure serve as energy directors for the liquefaction of the thermoplastic material.

The embodiments described herein show a sonotrode 7 (or 'horn') as a separate piece that is pressed against the proximally facing coupling face of the second object.

However, especially in embodiments in which the second object is metallic, the second object may be a sonotrode directly coupled to a vibration generating apparatus. It may, for example, be provided with a proximal thread or bayonet-coupling structure or similar for being fastened to an according coupling of the vibration generating apparatus.

Figure 2:
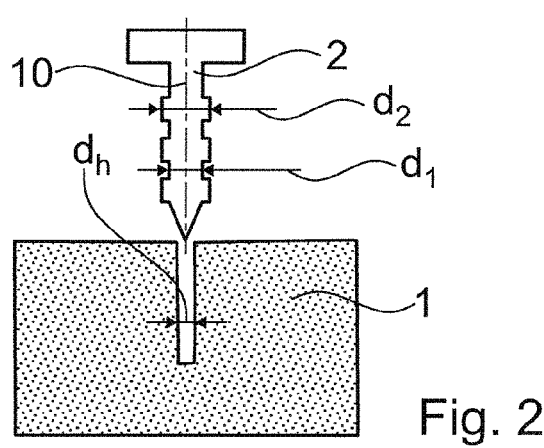
FIG. 2 an alternative configuration for a bonding process similar to the process of the first embodiment.

While the embodiments of FIGS. 1a-2 are assumed to have a rotational symmetry about the axis 10, this is not a requirement. Rather, it may even be advantageous to provide especially the anchoring portion with a structure that deviates from a circular symmetry, as discussed hereinbelow.

FIGS. 3a and 3b yet show an embodiment in which the second object 2 has an inner portion 21 and an outer portion 22, with a gap 23 therebetween. The coupling structures are defined along an outer surface of the inner portion and/or an inner surface of the outer portion and/or an outer surface of the outer portion. In the depicted embodiment, the couplings structures (circumferentially running ribs that define grooves between them) are present only along an outer surface of the inner portion.

When the second object is pressed into the first object while thermoplastic material of the first object is liquefied, portions of the liquefied material flow into the gap (flow 11 in FIG. 3b). In addition to anchoring the second object in the first object, this material will, after completion of the process, also stabilize the inner portion and the outer portion with respect to each other.

The following options apply:
The inner portion and the outer portion may together be of one piece, or they may be constituted by discrete pieces, like in FIGS. 3a and 3b.
In the latter case, they may optionally be made of different materials. For example, if the second object is to be a fastener for fastening something to the first object, the inner portion may be of a metal, while the outer portion may be of a lighter, less hard material, for example a plastic material with a higher melting temperature (liquefaction temperature) than the first object material. This includes the possibility that the material of the outer portion is of a material that is above its glass transition temperature at the liquefaction temperature of the first object material so that it is deformable, the deformation contributing to the anchoring, as pointed out hereinbefore and explained in more detail hereinafter referring to FIGS. 17a-20.
If the inner and outer portions are discrete pieces, they may both reach to the proximally facing coupling face, or, as in the depicted embodiment, only one of them reaches to the coupling face. In the depicted embodiment, the vibrations are coupled into the inner portion via the outer portion.
Similarly to FIG. 2, a bore may be made in the first object prior to the step of pressing the second object against the first object. Such a bore may for example be made for the inner portion only. Alternatively, it would also be possible to make a bore with an inner bore portion and, for example, cylindrical outer bore portion, for the respective portions of the second object.

The inner portion 21 and/or the outer portion 22 may be rotationally symmetric about an axis (the insertion axis/anchoring axis), or its structure may deviate from such symmetry.

Also the embodiment of FIGS. 3a and 3b can be carried out with a bore in the first object, similarly to the bore 20 illustrated in FIG. 2. The diameter of the bore can be chosen to be adapted to the dimensions of the core portion 21, in accordance with the discussion of FIG. 2 hereinbefore.

While the first and second portions 21, 22 in the embodiment of FIGS. 3a/3b are shown to be pre-assembled, generally in embodiments with two portions that are not of one piece, the portions may be assembled in-situ, for example by material of the first object connecting the portions and/or material of the second portion that has become deformable during the process or by other features.

In FIGS. 3a/3b, the portions are assembled prior to being anchored, and the flow portion fills the gap 23 between them, with the effect of yielding an additional bonding stability between the portions 21, 22.

For a gap between an inner portion 21 and an outer portion 22, a minimal width of 0.1 mm should be present in order for the thermoplastic material to be capable to flow into.

FIG. 4a depicts, in a view, an embodiment in which the second object has a metallic inner portion 21, for example of steel, and an outer portion 22 of a plastic, for example of PEEK. The embodiment of FIG. 4a has the following features that can be present together but that can also be realized individually or in combinations.

- The central portion has a tube section extending from the distal end (this includes the possibility of it being entirely tube shaped).
  - The central portion includes an inner thread 26 or other structure. If the tube section extends to the proximal end, the inner thread may also extend to the proximal end and may serve after the anchoring for mounting a further object to the second object.
- The coupling structure of the inner portion is not rotationally symmetric but includes axial channels 24 that may direct the material flow.
  - In embodiments, such axial channels 24 are deeper than the circumferential grooves 5 with which the positive-fit connection is caused, so as to serve as material distribution channels.
- The outer portion 22 is not circularly symmetric but includes a plurality of outer axial protrusions that distally end in an edge or tip.

The embodiment of FIG. 4a is an example of an embodiment in which the second object forms a proximal body (or head portion) 29, with distal protrusions extending therefrom. The distal protrusions in the depicted embodiment are formed by leg-like extensions 28 (outer protrusions) and the distal part of the first portion 21 (inner protrusion); configurations with a circumferentially running, for example skirt-like outer protrusions are possible also.

In the hereinbefore described embodiments, the second object is anchored in a depth-effective manner by providing the second object with an anchoring portion that extends along the anchoring axis, and in some embodiments with the aid of a bore in the first object. These embodiments may have a plurality of structure elements (the grooves 5, for example) into which liquefied material of the first object may flow, which structure elements are spaced axially from each other, such as arranged along a shaft and/or tube or similar.

In the variant of FIG. 4b, the metallic inner portion 21 is pre-assembled with the plastic outer portion 22. To add stability to this pre-assembly, the structures 4 of the inner portion 21 extend proximally into the region of the proximal body 29 and are cast into material of the outer portion 22.

After the process of bonding the second object 2 to the first object 1, the effective height h of the proximal body 29 is higher than its initial physical axial extension, because the flow portion of the thermoplastic material has filled the gap 23 between the inner and outer portions (backflow) (FIG. 4c). A certain backflow will also take place into the central opening of the inner portion 21 if such central opening, as illustrated, is open to the distal side. If such backflow is to be prevented, the opening may be closed off distally, for example by a tip-shaped end element.

The situation after the process as shown in FIG. 4c illustrates nicely how the outer portion 21 serves as mounting piece for a further object, with the outer portion 22 replacing a prior art mounting flange, wherein the outer portion can be of a lightweight, low-cost material and still add substantial mechanical stability to the connection, especially with respect to angular momenta on an object fastened to the inner portion 21 (thread 26).

If necessary, additional stability with respect to axial forces may be provided if the outer portion is provided with inner structures (grooves or similar) that are embedded by the flow portion of the thermoplastic material to yield another positive-fit connection.

In the configuration depicted in FIGS. 4b and 4c, the distal ends of the inner portion 21 and of the protrusions 28 of the outer portion 22 are depicted to extend to an approximately same axial depth (the bottom line is illustrated to be at equal height). This is not a requirement. Rather, the axial extensions of the inner protrusion formed by the inner portion 21 and of the outer protrusion/outer protrusions may generally be chosen independently of each other, depending on requirements. For example, the inner portion 21 may extend further than the outer portion's protrusion(s) 28, or it may extend less far than the latter.

It may in special embodiments extend to not even reach the plane defined by the proximal surface in the assembled state (FIG. 4c, the plane reaching the bottom of arrow h) so that it is not pressed into the first object but is only embedded in flowable thermoplastic material that has flowed towards proximally due to the pressing force (backflow of the flow portion).

Figure 4D:
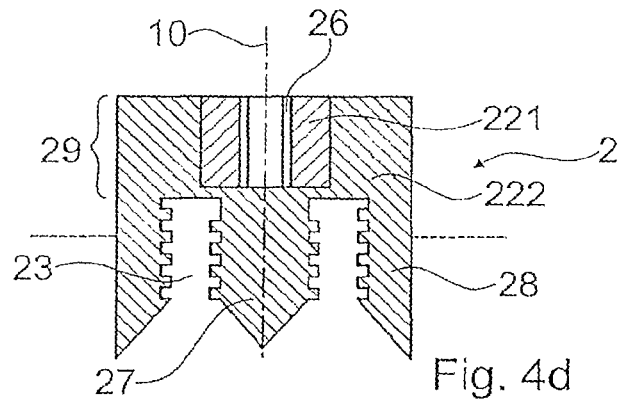
FIG. 4d a further variant of a second object.

FIG. 4d yet shows a variant in which the first (inner) portion 221 does not reach to the distal end of the second object. Rather, the second portion 222 of the plastic material includes both, at least one distal protrusion 28 and at least one inner (central) distal protrusion 27. As in the previous embodiments, the second object may be circularly symmetrical with respect to rotations around the axis 10 or may have discrete distal protrusions (such as shown in FIG. 4a).

Figure 5A:
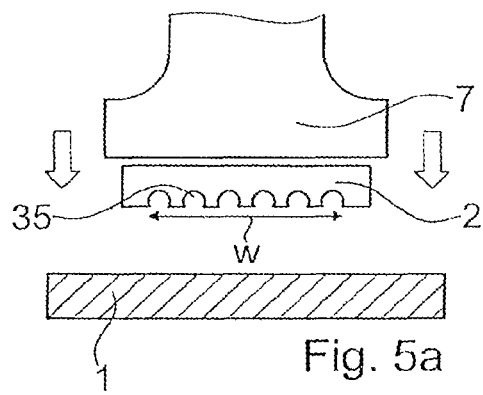
FIGS. 5a and 5b a bonding process with alternative first and second objects.
Figure 5B:
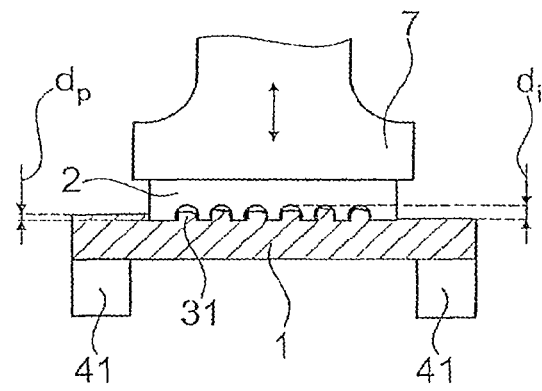

The embodiment of FIGS. 5a and 5b, in contrast, is suitable for anchoring the second object with respect to the first object also if the first object is flat. To this end, the second object includes a plurality of structure elements for the liquefied material to flow into, which structure elements are spaced laterally from each other, i.e. extend along a plane which during the anchoring is parallel to a surface plane of the first object. At least some of the structures elements define an undercut.

More in particular, in the embodiment of FIGS. 5a and 5b, the second object includes a plurality of indentations 35 that in cross section have the shapes of circular segments with a central angle of more than 180° so that an undercut is generated. The indentations 35 may extend as grooves along the plane perpendicular to the drawing plane, or they may be present in other shapes and configurations.

As illustrated in FIG. 5*b*, the step of pressing and coupling vibrations into the tool will cause liquefaction to set in superficially at the interface between the first and second objects, whereafter liquefied thermoplastic material will flow into the indentations and thereby, due to the undercut, fasten the second object to the first object after re-solidification.

Yet another optional feature of this embodiment and of other embodiments of the invention is schematically illustrated in FIG. 5*b*. When the second object is pressed against the first object, a counter force has to act on the first object. In many embodiments, this counter force will be exerted by a non-vibrating support on which the second object is placed, such as by a working table or floor or dedicated support. Such a non-vibrating support will in many cases be arranged such that the portion of the first object that is immediately underneath the second object (more in general, the portion of the first object that extends distally from the interface between the first and second objects) is supported. However, this need not be the case. In FIG. 5*b*, the support structure 41 is such that immediately underneath the second object there is no support for the first object, i.e. the distal side of the first object is exposed. This may be advantageous in situations where the distal surface of the first object has a well-defined shape or other properties that must not be affected by the bonding process.

The feature of having the distal surface of the first object distally of the interface to the second object exposed is independent of the other features described referring to FIG. 5*b*, i.e. it may be implemented also in other embodiments, and the embodiment of FIGS. 5*a* and 5*b* may also be carried out in an arrangement in which the distal surface is supported.

In the embodiment of FIGS. 5*a* and 5*b*, being an example of a planar bond, the depth $d_i$ of the intermixing zone is larger than the penetration depth $d_p$ by which the second object penetrates into the first object. This nicely illustrates the fact that these embodiments are, among others, especially suited for bonding a second object to a flattish first object or other object on which depth-effective anchoring is not possible. Nevertheless, also these embodiments do not feature the hereinbefore discussed disadvantages of adhesive bonds.

The width w of the bond/of the intermixing zone in embodiments of a planar bond in at least one lateral dimension and often in both lateral dimensions is substantially larger than the penetration depth, this being a further possible characteristic of planar bonds.

With respect to FIGS. 6*a*-6*d* yet a combined bonding process is described. The second object 2 is assumed to have a shape similar to the one described referring to FIGS. 1*a*-2 with an anchoring portion including a plurality of protrusions and indentations between the protrusions. The second object includes a thermoplastic material with a liquefaction temperature substantially higher than a liquefaction temperature of the first object. For example, the second object may be made of PEEK, while the first object is made of PBT or Polycarbonate.

The first object includes a through bore 20 in which the second object is anchored.

Figure 6A:
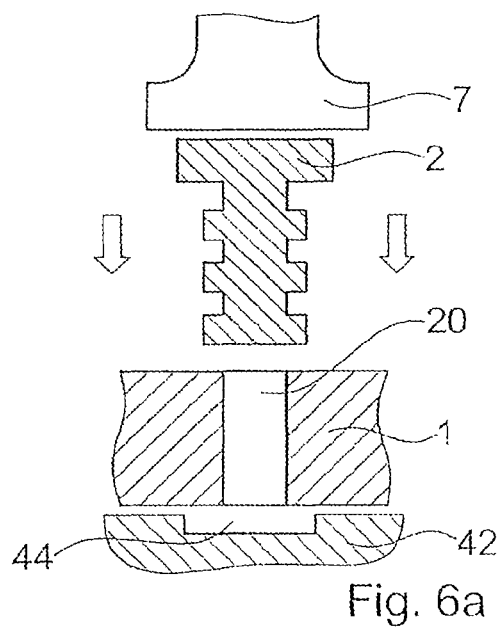
FIGS. 6a-6d a bonding process according to yet a further embodiment.
Figure 6B:
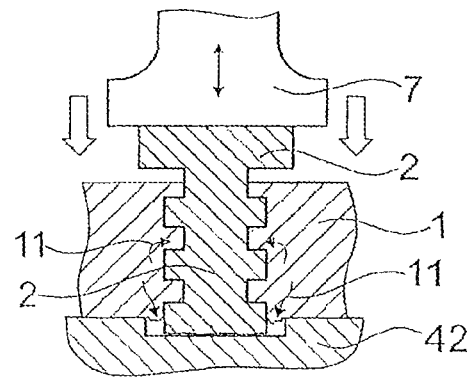
Figure 6C:
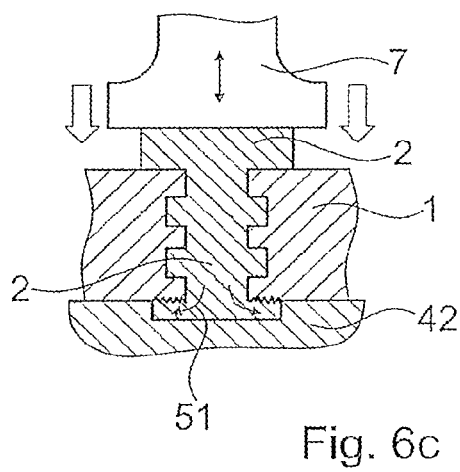
Figure 6D:
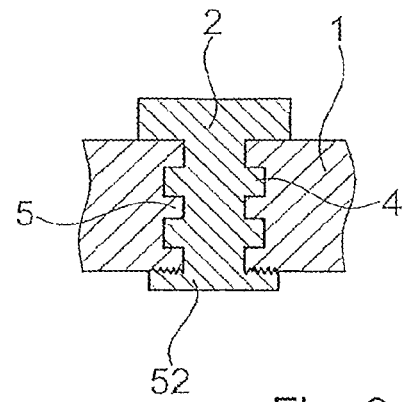

To this end, in a first stage, illustrated in FIG. 6*b*, the second object is pressed against the first object while mechanical vibrations are coupled into it, until liquefaction of thermoplastic material of the first object sets in, so that the second object is advanced towards the distal directions, while a flow 11 of thermoplastic material of the first object into the indentations 5 of the second element takes place.

The support 42 against which the first object is placed in this embodiment includes a mould portion that forms a cavity 44 when the first object abuts against the support. The second object is provided with an excess length so that at some stage of the process, before a distally facing stop face of the head portion 6 abuts against the first object, the distal end of the anchoring portion abuts against the support 42. Thereafter, the pressing force and the mechanical vibrations are further applied and possibly intensified until also thermoplastic material of the second object 2 becomes flowable (flow 51 in FIG. 6*c*) and fills the cavity. This will result in the second object being bonded to the first object by an additional rivet effect (FIG. 6*d*) by way of the head portion 6 and a foot portion 52

The fact that thermoplastic material of the first object has flowed into structures of the second object in addition to contributing to the anchoring also causes a sealing effect.

Figure 7A:
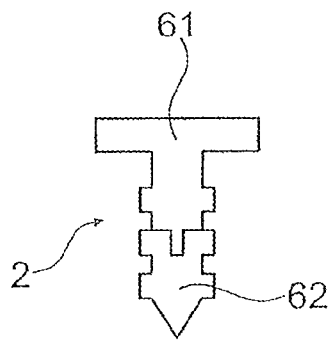
FIG. 7a a hybrid second object for the process of FIGS. 6a-6d.

While in the embodiment of FIGS. 6*a*-6*d* and in other embodiments, the first and second objects are both assumed to be essentially homogeneous, this need not be the case. Rather, the first and/or second object may be a hybrid including portions of different materials. For illustration purposes, FIG. 7*a* depicts an embodiment in which a second object 2, for example to be bonded to a first object in a process as illustrated referring to FIGS. 6*a*-6*d*, includes a metal portion 61 and a distal plastic portion 62, for example of PEEK.

Figure 7B:
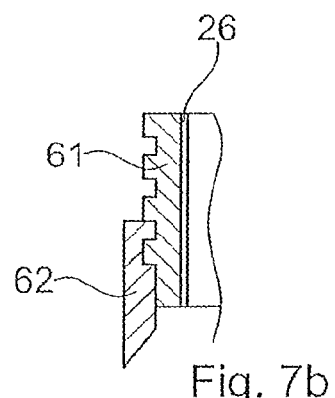
FIG. 7b, in partial cross section, a further hybrid second object.
Figure 7C:
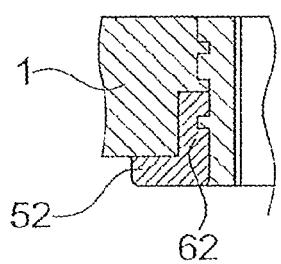
FIG. 7c, again in partial cross section, the second object of FIG. 7c after the process.

In the variant shown in FIG. 7*b*, the distal plastic portion 62 is a sheath element connected to the metal portion 61 in a positive-fit like manner. FIG. 7*c* illustrates the situation after the process, with a deformed part of the plastic portion 62 forming the foot portion 52, as illustrated hereinbefore.

Embodiments of the combined bonding process with the additional rivet effect are also especially suited for bonding a further object to the first object, with the rivet-like connector constituted by the second object securing the first and further objects to each other, as explained referring to other embodiments in more detail hereinafter.

Figure 7D:
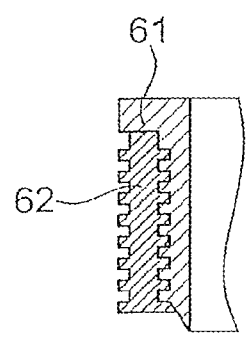
FIG. 7d a further hybrid second object, useable for bonding processes without any foot portion formation.

FIG. 7*d* yet illustrates that a hybrid second object 2 with a metallic portion 61 and a plastic portion 62 may also be suitable as a connector in processes of the kind described hereinbefore, for example referring to FIGS. 1*a*-1*d* or 2.

Figure 8:
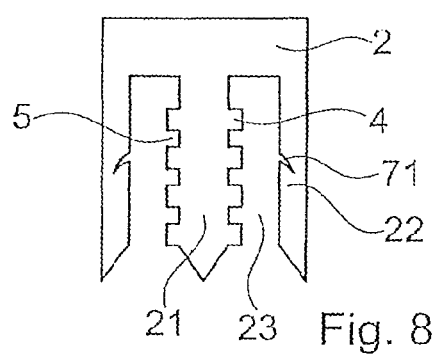
FIGS. 8 and 9 further embodiments of second objects.

FIG. 8 shows a further embodiment of a second object 2. Similarly to the two-piece embodiment of FIGS. 3*a* and 3*b*, it includes an inner part 21 and an outer part 22 between which the thermoplastic material of the first object may flow. More in particular, the inner part 21 is shaft-like with outer structures 4, 5 that form an undercut with respect to axial directions. In addition or as an alternative, the outer part 21 has inwardly facing structures, such as the depicted groove 71 forming an undercut.

In the depicted embodiment, the second object is of one piece forming the inner and outer parts 21, 22. The gap 23 in embodiments like 4*a*, 4*b*, 4, 8 and others may be viewed as opening open to the distal side encompassing the central protrusion 21.

Compared to embodiments with just one pin-shaped shaft, the embodiments with an inner portion and an outer portion due to the interplay between the inner and outer portions bring about additional anchoring stability, especially if the thermoplastic material of the first object is comparably soft or thin or brittle.

Figure 9:
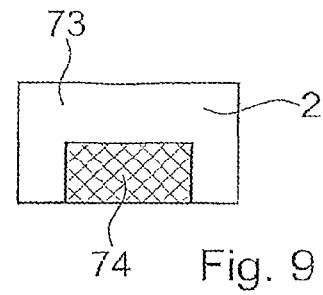

In the embodiment of FIG. 9, the second object 2 includes a body 73 of, for example, solid metallic material, and an interpenetration piece 74 of an open porous material, such as metal foam or a metal mesh. The interpenetration piece is fastened to the solid metallic material. The body 73 forms at least part of the proximally facing coupling-in face, and the interpenetration piece 74 forms at least a part of the surface portion that is brought into contact with the first object. Due to the effect of the mechanical vibration and the pressing force, the thermoplastic material penetrates into the interpenetration piece and that due to its open porous structure forms undercuts and thus forms the coupling structures.

Figure 10:
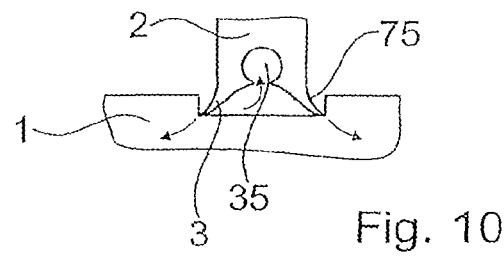
FIG. 10 a further bonding process with an alternative second object.

The embodiment of FIG. 10 is an example of an embodiment with an inwardly facing coupling structure. More in particular, the second object 2 has an undercut indentation 35 into which the thermoplastic material penetrates. An outer distal tip or edge 3 serves as energy director. Due to an outward bend of the distal edge 3, the outer surface 75 of the second object also forms a coupling structure with an undercut with respect to axial directions. The embodiment of FIG. 10 is an example of the principle described referring to FIGS. 5a and 5b with the depth of the intermixing zone exceeding the penetration depth being applied to an element for a point connection instead of a flattish connection.

Figure 11:
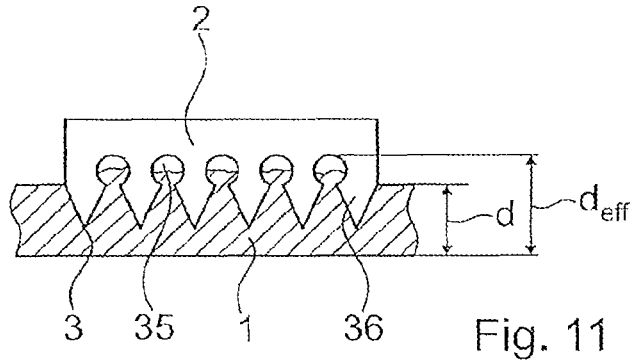
FIGS. 11-16 further embodiments for bonding a second object to a flat first object.

FIG. 11 shows an alternative embodiment of a flattish connection with the depth of the intermixing zone exceeding the penetration depth. The embodiment is an example of an embodiment that is optimized for a flattish connection to a first object in which the impact of the connection is to be minimized, for example because surface portions to which the second object 2 is not directly attached (distal surface portions and/or proximally facing surface portions around the second object) need to maintain a certain quality. The bonding principle, like in FIG. 5a/5b, is based on undercut indentations 35. The following measures are implemented in the embodiment of FIG. 11:

The second object 2 includes protruding structures 36 with distal edges or tips 3 that serve as energy directors and cause a swift onset of the liquefaction around the protruding structures.

Figure 12:
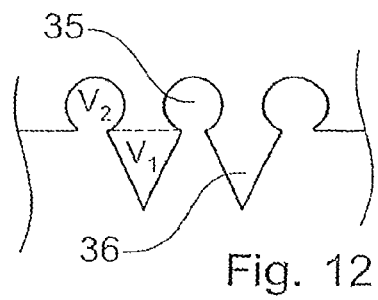

A volume $V_1$ of the protruding structures is smaller than or equal to a volume $V_2$ of the indentations (see FIG. 12) into which the thermoplastic material may flow. The separation depth between the volumes $V_1$, $V_2$ (dotted line in FIG. 12) in this is defined to correspond to the depth by which the second object is inserted into the first object, i.e., the dotted line corresponds to the level defined by the proximally facing surface of the first object. By this measure, it is assured that for all portions of thermoplastic material that are displaced by the protruding portions, there is a space to flow to in the immediate vicinity. Thus, the method works with minimal material displacement and hence minimal heat flow.

Figure 13:
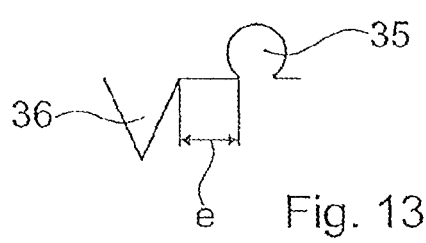

The indentations and protrusions are arranged immediately next to each other. I.e., there is no distance e (FIG. 13) between the protrusions 36 and the indentations 36, or such distance is minimal. Also by this measure, material flow and thus heat flow is minimized.

In the embodiment of FIG. 11, the shown structures may extend cylindrically perpendicularly to the drawing plane. Alternatively, the indentations or the protrusions may be circular or have another shape confined in both lateral dimensions, and be arranged in a pattern over the surface. For example, the second object may have a regular arrangement of dome shaped (especially spherical dome shaped) indentations, each surrounded by a ridge shaped protrusion. Or the mountain-like protrusions could form a pattern, with groove-like indentations between them. Also segmented and other arrangements are possible.

FIG. 11 also illustrates that by the depth of the intermixing zone being greater than the penetration depth, in the region of the bond to the second object, an effective thickness $d_{eff}$ is enhanced compared to the real, physical thickness d of the object.

Figure 14:
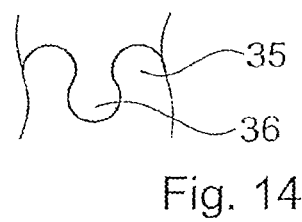

In the embodiment of FIG. 11, due to the tip or edge shaped protrusions, a relatively large depth is required for the anchoring. In alternative configurations a compromise between the energy directing effect of edges or tips and the requirement of smaller depth can be made, for example by using rounded protrusions 36 as sketched in FIG. 14.

Figure 15:
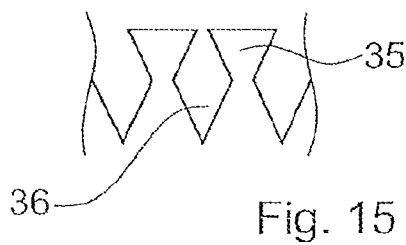

Also other cross sectional shapes may be feasible, including more edgy shapes as illustrated in FIG. 15. Such shapes may, depending on the chosen manufacturing method, be easier to manufacture by methods such as cutting or milling. More generally, manufacturing of the first object may include material removing methods as well as casting methods, or, as mentioned, the use of open porous structures.

Figure 16:
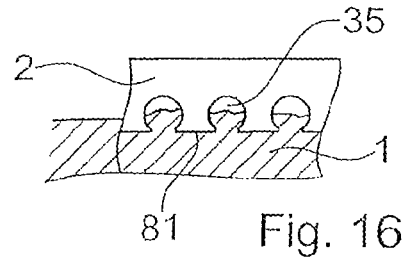

In contrast, for example, to second objects 2 of the kind illustrated in FIG. 11, the energy impact and required pressure are higher for second objects as shown in FIG. 5a or also in FIG. 16 with a generally flat distal end face 81. Objects of this kind are especially suited for anchoring in very thin first object (such as organo sheet material). The bond is optimized for maximum strength per penetration depth, whereas generally the impact of the bonding process of the first object is higher than in the embodiments of FIG. 11 and others.

In the hereinbefore described embodiments, the coupling structures that include an undercut with respect to axial (proximodistal) directions and thereby make a positive-fit connection possible are pre-manufactured properties of the second object. Hereinafter, embodiments where this form lock structure is formed during the process by deformation are described.

Figure 17A:
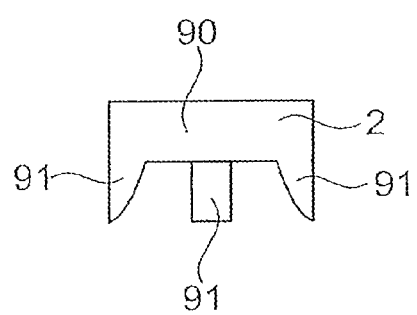
FIGS. 17a-17b a boding process of a second object with a deformable section to a first object.

FIG. 17a depicts a basic embodiment of this principle. The second object 2 includes a main portion 90 and a plurality of deformable legs extending distally of the main portion 90. The material of the second object may be such that plastic deformation of the legs and/or elastic deformation of the legs is possible. In embodiments, the second object is made of a metal, with the legs being sheet portions of a thickness sufficiently thin to make deformation under the conditions that apply during the bonding process possible. Alternatively, the second object may be of a polymer-based material with an appropriately chosen content of a reinforcement, or of any other suitable material or agglomerate.

Figure 17B:
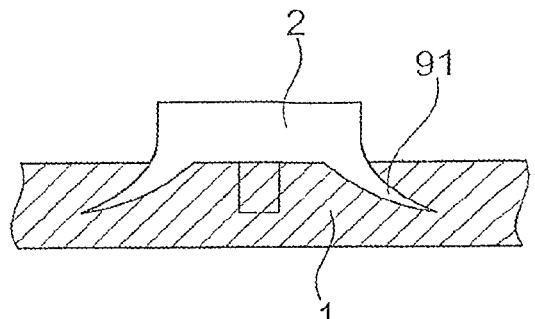

FIG. 17b depicts the second object 2 anchored in the first object 1. The legs 91 upon insertion under the impact of the mechanical energy and pressing force are deformed to be spread outwardly, thereby after re-solidification yielding the coupling structures.

Figure 18:
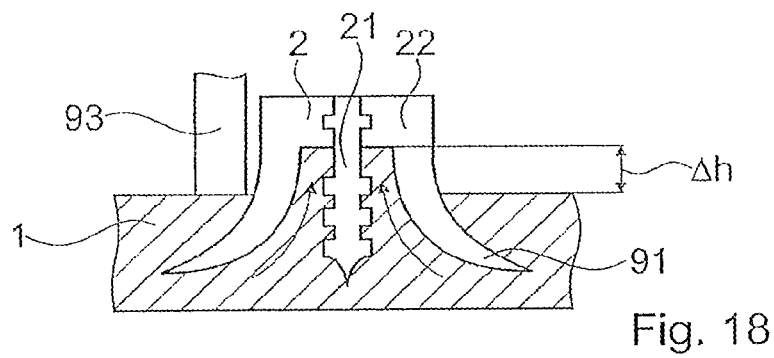
FIGS. 18-20 variants of such a process.

FIG. 18 shows an embodiment that combines the principles of the embodiments of FIGS. 3a/b and 17a/b. In addition to including an outer portion 22 with a deformable portion 91 (deformable leg or other deformable structure), the second object also includes an inner portion that in the shown embodiment is not deformable.

FIG. 18 also illustrates two further principles that are applicable independent of the configuration of FIG. 18.

Firstly, the method in embodiments further includes pressing a retaining device 93 against the proximal face of the first object in a vicinity of the second object while the second object is bonded to the first object (in FIG. 18 the retaining device is shown on the left-hand side only, but it may also fully surround the second object). By this, bulges or the like caused by pressing the second object into the first object (c.f. FIG. 1*b*/1*c*) are avoided.

Secondly, similarly to the embodiments of FIGS. 5, 10, 11 and others, the process may be carried out to cause a backflow of material into the interior space of the second object, here the space between the inner and outer portions. Thereby, the proximal-most portions of the thermoplastic material that has flowed during the process is proximally of the initial proximal end face. This backflow, as described hereinbefore, enhances the effective anchoring depth. In embodiments, a retaining device 90 of the described kind may assist the process in that a pressure is maintained around the second object, and the backflow is caused to be within the interior space/cavity instead of around it. The quantity Δh shown in the figure shows the difference by which the material has flowed inside relative to the proximal end face around the second object, and this quantity Δh may also correspond to the enhanced effective anchoring depths.

Figure 19:
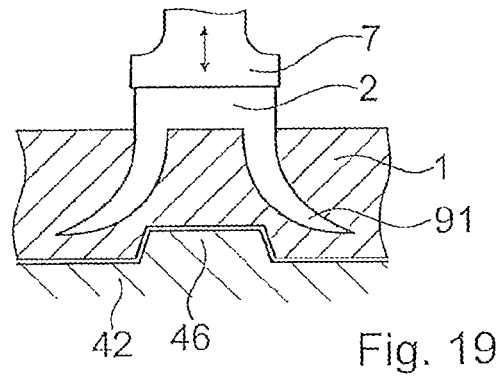

FIG. 19 shows an example of an embodiment in which the support 42 against which the assembly of the first and second objects are pressed by the sonotrode 7, has a shaping feature that assists the deformation of the deformable portion of the second object 2. More in particular, in the embodiment shown in FIG. 19, the support 42 has a shaping protrusion cooperating with a corresponding indentation of the first object 1. The shaping protrusion is of a material that is not liquefiable and does not soften during the process. Also, possibly the support including the protrusion 46 or other shaping feature may have a cooling effect, for example by being actively cooled, so that the first object material remains hard at the interface to it. Thereby, the deformable section is guided in the deformation process, to project away from the shaping feature, as shown in FIG. 19. More in particular, the deformable legs that constitute the deformable section are caused to be bent outwardly away from the shaping protrusion 46.

Figure 20:
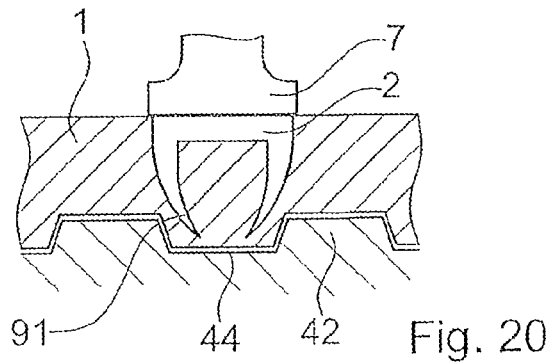

FIG. 20 shows an alternative embodiment where the shaping feature includes a shaping indentation 44, so that the deformable legs are caused to be bent inwardly into the configuration shown in FIG. 20. Various other alternatives are possible.

Generally, the second object may have the purpose of serving as an anchor for a further object to be attached to the first object, or may itself be such a second object (in the above figures, the first object are illustrated without any functional structures for such purpose, however, any such structures such as fastening structures or other functional structures are possible.

Hereinafter, embodiments in which a further object ("third object") is bonded to the first object in the bonding process by bonding the second object to it, are described.

Figure 21A:
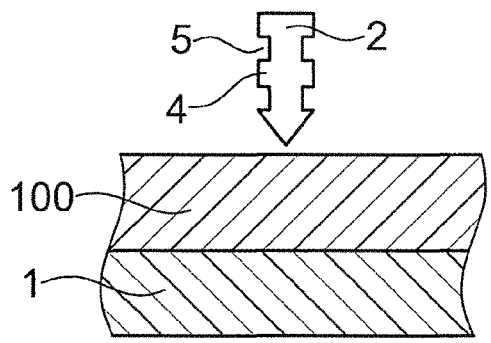
FIGS. 21a and 21b bonding a third object to the first object by the second object.
Figure 21B:
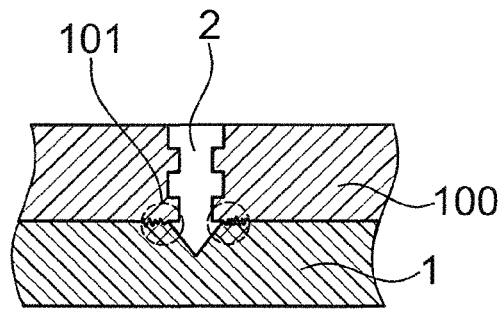

FIG. 21*a* depicts a basic configuration. The second object 2—serving as a connector in the embodiments in which the first object is bonded to a further, third object—is depicted to be similar to the connector of FIG. 1*a* without a head portion. Alternatively, other shapes of second objects are possible; especially all objects described in this text suitable for depth-effective anchoring, including second objects with a head portion, may be used. The third object 100 is shown as thermoplastic body, similar to the first object 1. It lies against the proximal face of the first object 1. For bonding, the second object 2 is driven both, through the third object 100 and the first object to be anchored in both, the first and third objects, as illustrated in FIG. 21*b*.

The third object may include a thermoplastic material capable of being welded to the thermoplastic material of the first object 1. For example, it may be of a thermoplastic material with a same polymer matrix. In a region around the second object, due to the liquefaction caused in the process a weld may be caused, as indicated by the circles 101. More in general, material of the third object in the process is pressed into the first object to contribute to the connection after re-solidification. This also holds if the materials of the first and third objects cannot be welded because they do not mix in the liquid state.

In addition or as an alternative to being driven through material of the third object, the second object (connector) may also be driven through a pre-made opening of the third object for its distal portion to be anchored in the first object. Such a pre-made opening may have a diameter allowing the second object to reach through it substantially without resistance (see an embodiment described hereinafter) or may encounter substantial resistance so that mechanical energy is absorbed also there.

Figure 22:
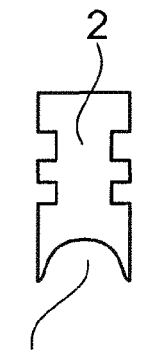
FIGS. 22 and 23, alternative second objects for such a bonding process.

FIG. 22 shows a variant of a second object 2. This variant is distinct from the previously described embodiments in that it has a compressing structure caused by a distally facing concave portion 111. This portion will cause thermoplastic material of the third object 100 to be pressed into the first object 1 yielding a more pronounced intermixing and, if applicable, weld, between the materials of the third and first objects.

Figure 23:
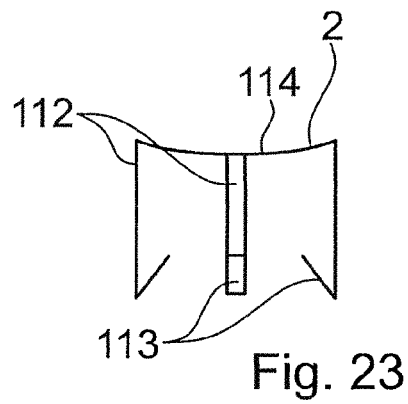

FIG. 23 shows a further example of a second object 2 suitable as a connector in the described sense. Especially, the second object 2 according to FIG. 23 is particularly easy to manufacture and may be produced as low-cost article. More in particular, the second object includes sheet portions for example of metal. The sheet portions form a plurality of legs 112 with barbs 113, all legs extending from a bridge portion 114 and being one-piece with it. The second object may be manufactured from a punched metal sheet by merely bending the legs away from the bridge portion 114 and bending the legs 112 to have the barbs 113.

Figure 24A:
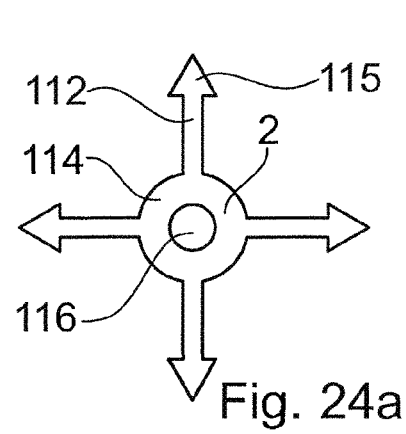
FIGS. 24a and 24b, a top view of a semifinished product for forming yet another second object, and a view of a section through the second object formed thereof.
Figure 24B:
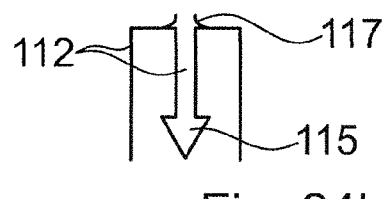

Similarly, the embodiment of FIGS. 24*a* and 24*b* has a head portion 114 (or bridge portion) with a plurality of legs extending therefrom. FIG. 24*a* shows a punched-out metal sheet as intermediate piece, and FIG. 24*b* depicts the second object 2 obtained by deforming this intermediate piece through bending. The legs may be provided with beads or grooves (the same holds for FIG. 23) for additional stability.

In this embodiment, instead of the barbs, the legs 112 have distal arrow portions 115. Combinations would be possible.

A further, optional feature that does not depend on the legs is constituted by a central hole 116 that may be used for guiding during the assembly process, for example together with a collar 117. Other uses of such a hole and/or collar are possible, including the fastening of a further object to the second object.

Figure 25:
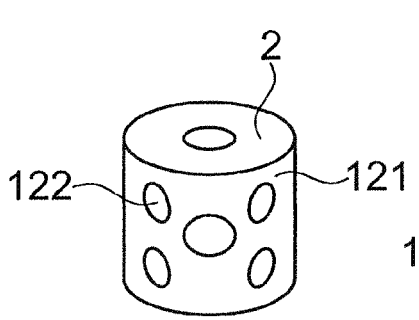
FIGS. 25 and 26 views of yet further second objects.

FIG. 25 shows a second object that is formed by a perforated metal hollow cylinder 121. The perforations 122 of the metal cylinder may be interpenetrated by thermoplastic material in the process and thereby ensure the positive-fit anchoring. To minimize proximal heating, the volume portion of the perforation might advantageously be close to or higher than 50%.

Figure 26:
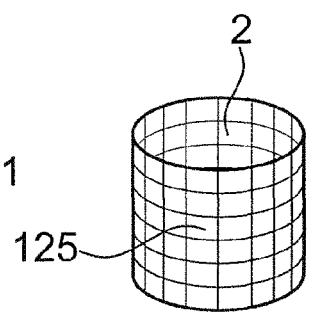

The second object of FIG. 26 includes a metal mesh 125 also formed into a hollow cylinder. The functioning principle is similar to the one of the hollow cylinder, with the meshes serving for interpenetration by the thermoplastic material.

Figure 27:
FIG. 27 a schematical horizontal section through a further second object.

Instead of being formed into a hollow cylinder, a perforated metal sheet or a mesh may be brought into other shapes for constituting a connector of the described kind. FIG. 27 very schematically illustrates a spiral shape as an option.

A further option in addition to cylindrical (FIGS. 25 and 26) and spiral shaped in which the material is stable is wave-shaped, for example extending along a length dimension. An amplitude of such a wave may be at last 5-10 times the thickness of the sheet or mesh.

An even further variant is a square (in cross section perpendicular to the axial direction) or other closed or open shape with a curve or buckling.

Second objects having structures as the ones described referring to FIGS. 22-27 as well as referring to FIG. 37 hereinbelow may generally be very thin and therefore sensitive to buckling. To this end, depending to the application, a proximal connector structure may be advantageous to provide stability.

Figure 28:
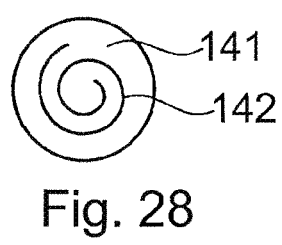
FIG. 28 a bottom view of a cap element of such a second object.

FIG. 28 shows a cap 141 with a groove 142 for serving as proximal bridge of a second object 2 with a spiral-shaped metal sheet or mesh to give the second object additional mechanical stability during the process.

Second objects with thin structures as the ones described referring to FIGS. 22-28 as well as referring to FIG. 37 hereinbelow are suitable for fixation also in relatively thin first objects, with rather minimal energy input. Because of their thinness a very small volume is displaced, and the melting zones will be very local. This minimizes the overall pressure and the overall energy input.

Second objects 2 as connectors of the kind described referring to FIGS. 22-28 may especially be suitable for fastening a first and a third object together in a staple-like or pin-like manner, by the process as described herein. In this, the way the first and third objects are arranged relative to one another with respect to the proximodistal anchoring axis may be varied, especially, it is also possible to press the connector through the first object into the third object instead of the other way round.

FIGS. 29a and 29b show a special application of the principle of using a connector to connect a third object 100 to a first object 1. The second object is assumed to have a hat-like shape with a circumferential protruding section 131 extending distally from a main body 132.

In this special example, the third object 100 includes a foam that by insertion of the second object 2 is compressed (compressed portion 102). Optionally, the second object may include relaxation openings 133 or other shape features that allow compressed material to flow away in case the foam has thermoplastic properties (which is not necessary). FIG. 29b illustrates corresponding flow-out portions 103.

While FIGS. 29a and 29b illustrate fastening of a foam material third object, similarly a third object of another material may be fastened by this approach, for example a soft and/or elastomeric material capable of being cut through by the distal structures of the second object or an object provided with a pre-manufactured bore for these structures.

In the embodiment of FIG. 30, the third object 100 is provided with a bore 109 through which the distal portion of the second object may be advanced to be brought into contact with the first object. In this, the third object 100 may be thermoplastic, and the bore 109 may be under-dimensioned in relation to the second object so that insertion thereof encounters resistance, and material of the third object around the bore 109 is displaced. Alternatively, the third object may be of a not liquefiable material. Then, the bore 109 needs to be dimensioned so that the distal portion of the second object fits through it or the distal tip or a distal edge cuts through the third object material.

The second object in the depicted embodiment includes a resilient barb structure 118 that allows pushing the distal portion of the second object through the bore 109 but that ensures anchoring in the first object 1 after liquefaction and re-solidification. The second object also has a proximal head portion 6 for securing the third object 100 against the first object 1.

As an alternative to having a resilient barb structure 118, the second object in a configuration like the one of FIG. 30 could also have a shape similar to the one of FIG. 1a, again with a proximal head portion 6, as for example shown in FIG. 31.

FIG. 32 depicts an embodiment in which a second object 2, for example being entirely metallic, is anchored in a through opening 20 of the first object. The through opening narrows towards the distal side (is countersunk), and the second object is accordingly tapered to be anchored around the opening. The first object 1 is assumed to be a thermoplastic sheet.

The bond of the second object to the first object is a flattish bond, similar to the one taught with respect to FIGS. 5a/5b; 11 and others, with structures for the interpenetration formed by sharp protruding structures 36 and indentations 35—even though the bonding surface of the second object is not planar but conical.

FIG. 33 shows an alternative where the through opening 20 of the first object is not tapered but stepped, with the fastening surface that includes the protruding structures 36 and the indentations 35 being anchored around the step.

According to yet another alternative, illustrated in FIG. 34, if the second object 2 is allowed to protrude above the proximal surface of the sheet-like first object 1, a head-like proximal extension 6 of the second object may have a distal end face that includes the structures 35, 36 to connect the second object to the rim of the opening.

Figure 35:
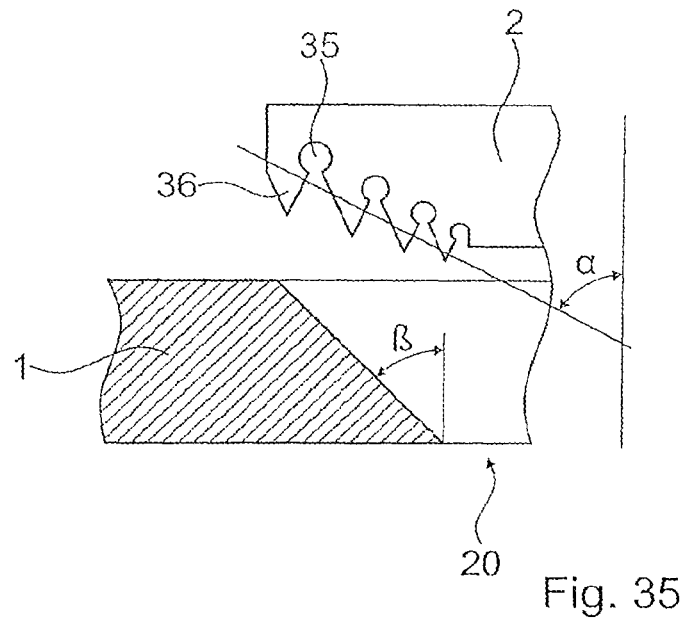

In the variant of FIG. 35, for a configuration otherwise similar to the one of FIG. 32, two optional further features are realized (the features may be realized independently of each other, with advantages if they are combined):

The size of the structure elements 35, 36 decreases towards the distally.

The opening angle $\alpha$ of the taper of the second object is greater than the opening angle $\beta$ of the taper of the through opening 20, whereby the second object penetrates further into the first object at more peripheral, proximal locations than at more central, distal locations.

Both measures have the effect that more energy is absorbed and more material is liquefied at more proximal, peripheral locations than at more distal, central locations around the opening. The effect is that the distal surface of the first object is kept intact.

Figure 36:
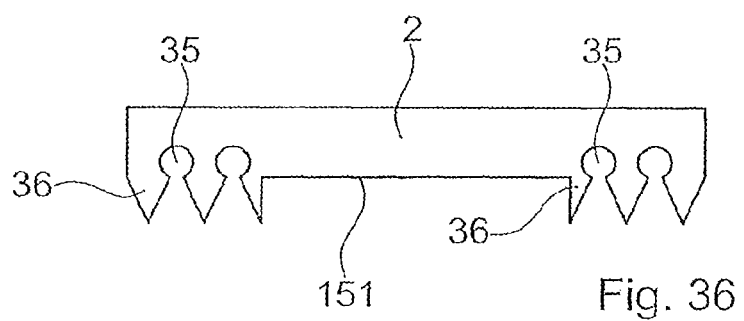
FIG. 36 another second object for being bonded to a first object.

FIG. 36 shows a variant of the embodiment of FIG. 11 in which, however, the structure elements that cause the bonding are restricted to the periphery of the second object 2. In more central positions, the distal surface 151 serves as a stop and abutment surface and thereby precisely defines the axial relative position. In this, the considerations of FIG. 12 concerning the relative volumes of the protruding structures 36 and the indentations 35 may be particularly advantageous.

FIG. 36 is thus a very schematically illustrated example of an embodiment in which a connection zone between the first and second objects only constitutes a portion of their mutual interface. In other portions of the interface, essentially no energy is transferred, and no liquefaction will take place.

Figure 37:
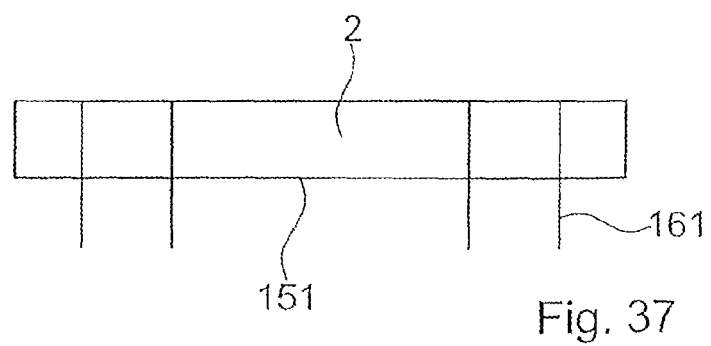
FIG. 37 an even further second object for being bonded to a first object.

In the embodiment of FIG. 37, protruding structures 161 for being anchored in the second object are attached to a main body of the second object and protrude distally in directions essentially parallel to the axial direction. The protruding structures may, for example, be formed similar to the structures illustrated in FIGS. 23, 24*b*, 25, and 26 and be particularly simple and cost efficient to manufacture.

In order to be stable with respect to buckling, the metal sheet or mesh may extend in a curved shape (for example, by forming a cylinder) or wave shape (perpendicular to the drawing plane) or other non-straight shape, as described hereinbefore.

In an example, the main body of the second object 2 may be of a liquefiable material (liquefiable at a same temperature as the thermoplastic material of the first object, at higher temperatures, or even at slightly lower temperatures), with the protruding structures 161 cast into them. In embodiments, a porosity of the structures may be at least 50%.

The invention claimed is:

1. A connector for being secured to a first object that comprises a thermoplastic liquefiable material in a solid state, the connector comprising:
   a connector body defining a distal end face and a proximal end face;
   the connector body defining a proximally facing coupling-in structure for being contacted by a tool that couples mechanical vibration energy into the connector body;
   the distal end face extending laterally with respect to a proximodistal anchoring axis, the distal end face being equipped to be pressed against the first object for the connector to be secure thereto while the mechanical vibration energy impinges on the connector body for causing a flow portion of the thermoplastic material of the first object to become liquefied and to flow relative to the connector body;
   wherein the distal end face comprises a plurality of laterally spaced openings, the openings being shaped to receive a flow of the thermoplastic material;
   wherein the laterally spaced openings each define an undercut structure with respect to proximodistal directions, whereby the thermoplastic material, after resolidification, secures the connector to the first object by a positive-fit connection between the undercut structure and the thermoplastic material;
   the connector further comprising a mounting structure for securing a further object to the first object.

2. The connector according to claim 1, wherein the laterally spaced openings are cavities open towards distally.

3. The connector according to claim 2, further comprising protrusions between the cavities.

4. The connector according to claim 3, further comprising a distal surface portion defining a separation plane, wherein a volume of the protrusions is smaller to or equal to a volume of the cavities, with respect to the separation plane.

5. The connector according to claim 1, wherein the connector body forms distal edges extending along the openings, the edges serving as energy directors.

6. The connector according to claim 5, wherein the energy directors are formed by distally protruding structures extending along the openings.

7. The connector according to claim 6, wherein the distally protruding structures are ridge shaped.

8. The connector according to claim 1, wherein the mounting structure comprises an undercut mounting structure being undercut with respect to proximodistal directions, whereby thermoplastic material of the further object is capable of flowing relative to the undercut mounting structure, and after re-solidification, to secure the further object to the connector and thereby to the first object by a positive-fit connection.

9. The connector according to claim 1, wherein the distal end face comprises a plane portion without any indentations or protrusions, the plane portion being equipped to serve as a stop and abutment surface during the process of securing.

10. A connector for being secured to a first object that comprises a thermoplastic liquefiable material in a solid state, the connector comprising:
    a connector body defining a distal end and a proximal end;
    the connector body defining a proximally facing coupling-in structure for being contacted by a tool that couples mechanical vibration energy into the connector body;
    wherein the connector body forms an inner distal protrusion and an outer distal protrusion, and a distally facing opening that extends around the inner distal protrusion and is located between the inner and outer distal protrusions;
    wherein the outer distal protrusion has a coupling structure forming an undercut with respect to proximodistal directions,
    whereby a flow portion of the thermoplastic liquefiable material flows relative to the outer distal protrusion towards proximally so as to embed the coupling structure, and after re-solidification of the thermoplastic material, locks the connector relative to the first object.

11. The connector according to claim 10, wherein the coupling structure of the outer distal protrusion comprises an inwardly facing coupling structure facing inwardly towards the opening.

12. The connector according to claim 10, wherein the inner distal protrusion has an inner coupling structure forming an undercut with respect to proximodistal directions, whereby the flow portion of the thermoplastic liquefiable material flows relative to the inner distal protrusion towards proximally so as to embed the inner coupling structure, and after re-solidification of the thermoplastic material locks the connector relative to the first object.

13. The connector according to claim 10, further comprising a mounting structure for securing a further object to the first object.

14. The connector according to claim 13, wherein the mounting structure comprises a thread accessible from proximally of the connector body.

15. The connector according to claim 10, wherein the outer distal protrusion extends circumferentially around the opening and has a plurality of distal extensions ending distally in a tip or edge.

16. The connector according to claim 10, wherein the coupling structure of the outer distal protrusion has at least one circumferential groove.

17. The connector according to claim 12, wherein the inner coupling structure has at least one circumferential groove.

* * * * *